(12) United States Patent
Dixon, III et al.

(10) Patent No.: US 7,003,489 B1
(45) Date of Patent: Feb. 21, 2006

(54) METHODS AND APPARATUS FOR SUBMITTING INFORMATION TO AN AUTOMATED LENDING SYSTEM

(75) Inventors: Walter V. Dixon, III, Delanson, NY (US); William D. Smith, II, Schenectady, NY (US); Melvin K. Simmons, Schenectady, NY (US); Robert J. Santimays, Monroe, CT (US); Jacques M. DesMarteau, Jamestown, NC (US); Ferdinand Steyer, Riverside, CT (US)

(73) Assignee: GE Capital Commercial Finance, Inc., Stamford, CT (US)

(*) Notice: Subject to any disclaimer, the term of this patent is extended or adjusted under 35 U.S.C. 154(b) by 0 days.

(21) Appl. No.: 09/391,772

(22) Filed: Sep. 8, 1999

(51) Int. Cl.
*G06F 17/60* (2006.01)
*G06K 9/34* (2006.01)
(52) U.S. Cl. .......................... 705/38; 705/35; 382/173
(58) Field of Classification Search ................. 705/35, 705/36, 38, 4, 7, 40; 707/1, 104.1, 500, 501.1; 235/375, 382, 203, 219; 340/426, 542; 709/203, 709/219; 715/500, 501.1
See application file for complete search history.

(56) References Cited

U.S. PATENT DOCUMENTS

| | | | | |
|---|---|---|---|---|
| 5,323,315 A | * | 6/1994 | Highbloom | ................... 705/38 |
| 5,550,957 A | * | 8/1996 | Davidson et al. | .......... 358/1.15 |
| 5,608,874 A | * | 3/1997 | Ogawa et al. | ............... 709/246 |
| 5,611,052 A | | 3/1997 | Dykstra et al. | ................ 705/38 |
| 5,629,846 A | * | 5/1997 | Crapo | ........................ 708/705 |
| 5,636,117 A | | 6/1997 | Rothstein | ........................ 705/4 |
| 5,699,527 A | * | 12/1997 | Davidson | ...................... 705/38 |
| 5,708,806 A | * | 1/1998 | DeRose et al. | .......... 707/104.1 |
| 5,819,271 A | | 10/1998 | Mahoney et al. | ............... 707/9 |
| 5,864,871 A | | 1/1999 | Kitain et al. | ............. 707/104.1 |
| 5,907,828 A | | 5/1999 | Meyer et al. | ................... 705/4 |
| 5,930,776 A | | 7/1999 | Dykstra et al. | ............... 705/38 |
| 5,970,464 A | * | 10/1999 | Apte et al. | ...................... 705/4 |

(Continued)

FOREIGN PATENT DOCUMENTS

EP 0474390 * 2/1997

(Continued)

OTHER PUBLICATIONS

Couger, Daniel J., "Evolution of Business System Analysis Techniques," ACM, Computing Surveys, vol. 5, No. 3, Sep. 1973, pp. 167-196.*

(Continued)

*Primary Examiner*—Ella Colbert
(74) *Attorney, Agent, or Firm*—Armstrong Teasdale LLP

(57) ABSTRACT

Methods and apparatus for submitting reports to an automated lending system are described. At a lowest level interface, a user manually submits information via a browser, and at a highest level interface, information is submitted via a print driver. Although the broadest spectrum of client base is addressed by having the loosest coupling to the accounting system, i.e., the lowest level interface, the loosest coupling requires the most user interaction. As the interface level increases, the accounting system has a tighter coupling with the system, which provides increased functionality at the expense of restricting the variety of client types that may be supported (e.g., platform and operating system specific).

19 Claims, 28 Drawing Sheets

U.S. PATENT DOCUMENTS

| | | | | |
|---|---|---|---|---|
| 6,016,482 | A | * | 1/2000 | Molinari et al. ............... 705/35 |
| 6,029,149 | A | | 2/2000 | Dykstra et al. ............... 705/38 |
| 6,041,365 | A | * | 3/2000 | Kleinerman ................. 709/328 |
| 6,049,782 | A | | 4/2000 | Gottesman et al. ........... 705/35 |
| 6,058,369 | A | | 5/2000 | Rothstein ..................... 705/10 |
| 6,061,792 | A | | 5/2000 | Simon ......................... 713/176 |
| 6,115,690 | A | * | 9/2000 | Wong ............................. 705/7 |
| 6,205,434 | B1 | * | 3/2001 | Ryan et al. ................... 705/35 |
| 6,208,979 | B1 | | 3/2001 | Sinclair ........................ 705/38 |
| 6,249,770 | B1 | * | 6/2001 | Erwin et al. ................. 705/10 |
| 6,266,150 | B1 | * | 7/2001 | Brossman et al. ......... 358/1.15 |
| 6,298,357 | B1 | * | 10/2001 | Wexler et al. .............. 715/513 |
| 6,369,907 | B1 | * | 4/2002 | Aoki ......................... 358/1.15 |
| 6,453,356 | B1 | * | 9/2002 | Sheard et al. ............... 709/231 |

FOREIGN PATENT DOCUMENTS

GB      2308692    * 12/1996

OTHER PUBLICATIONS

Brock, Horace R.; "Accounting principles and applications"; 1981; pp. 1-42.*

Dykeman, John; "Putting report scheduling on automatic"; Managing Office Technology; V39no; Oct. 1994; pp. 1-3.*

* cited by examiner

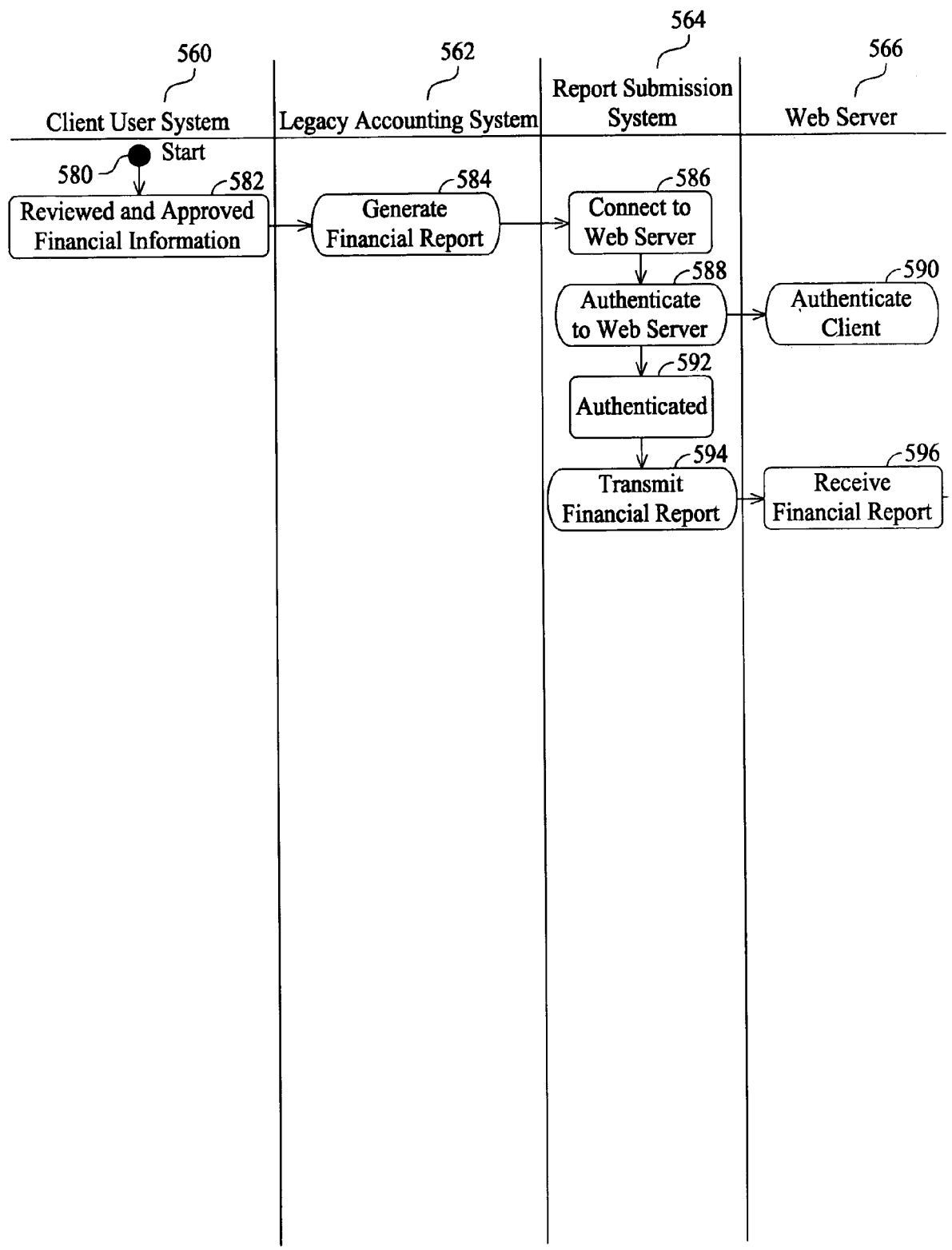
FIG. 21A    FIG. 21B →

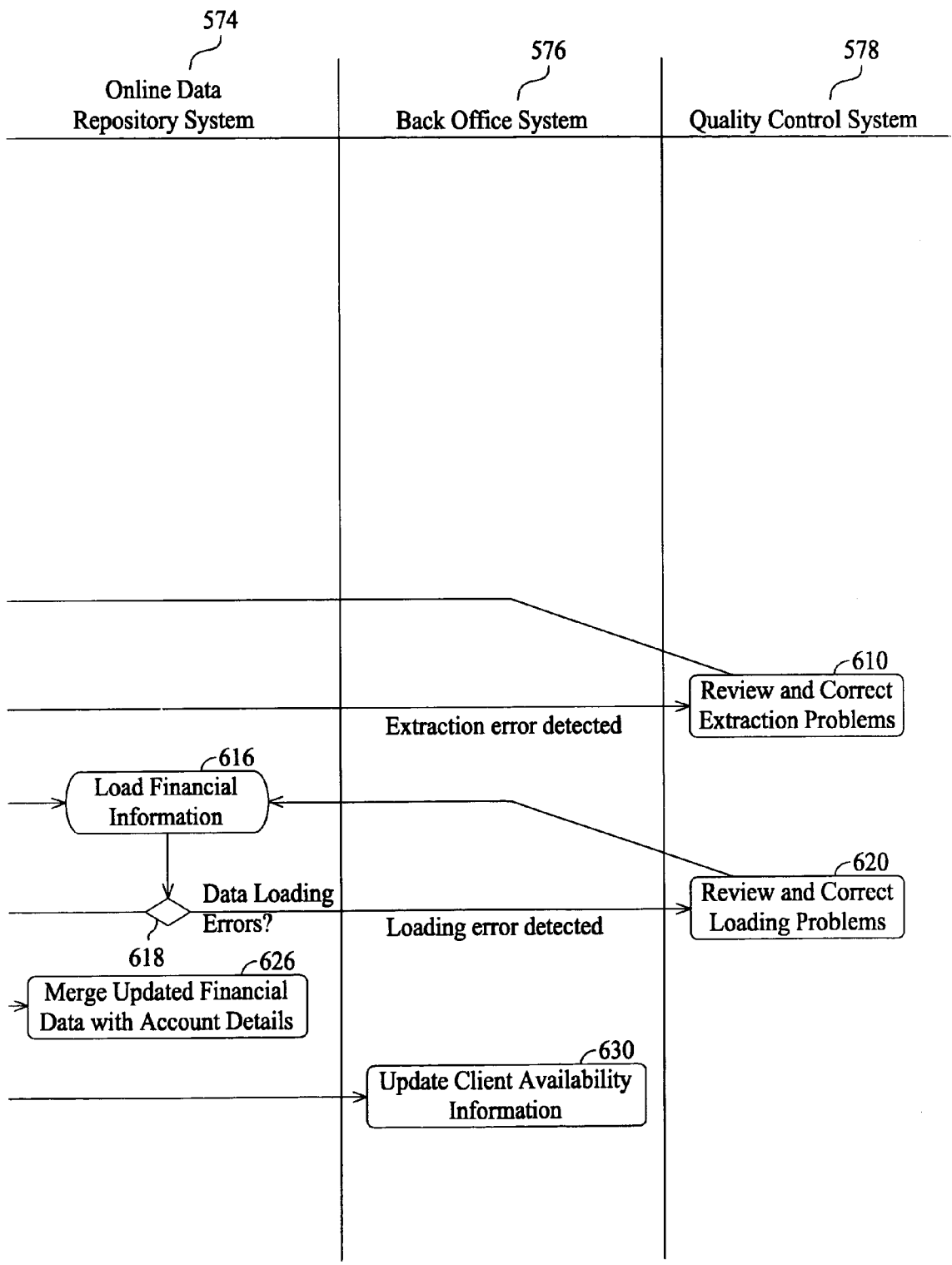

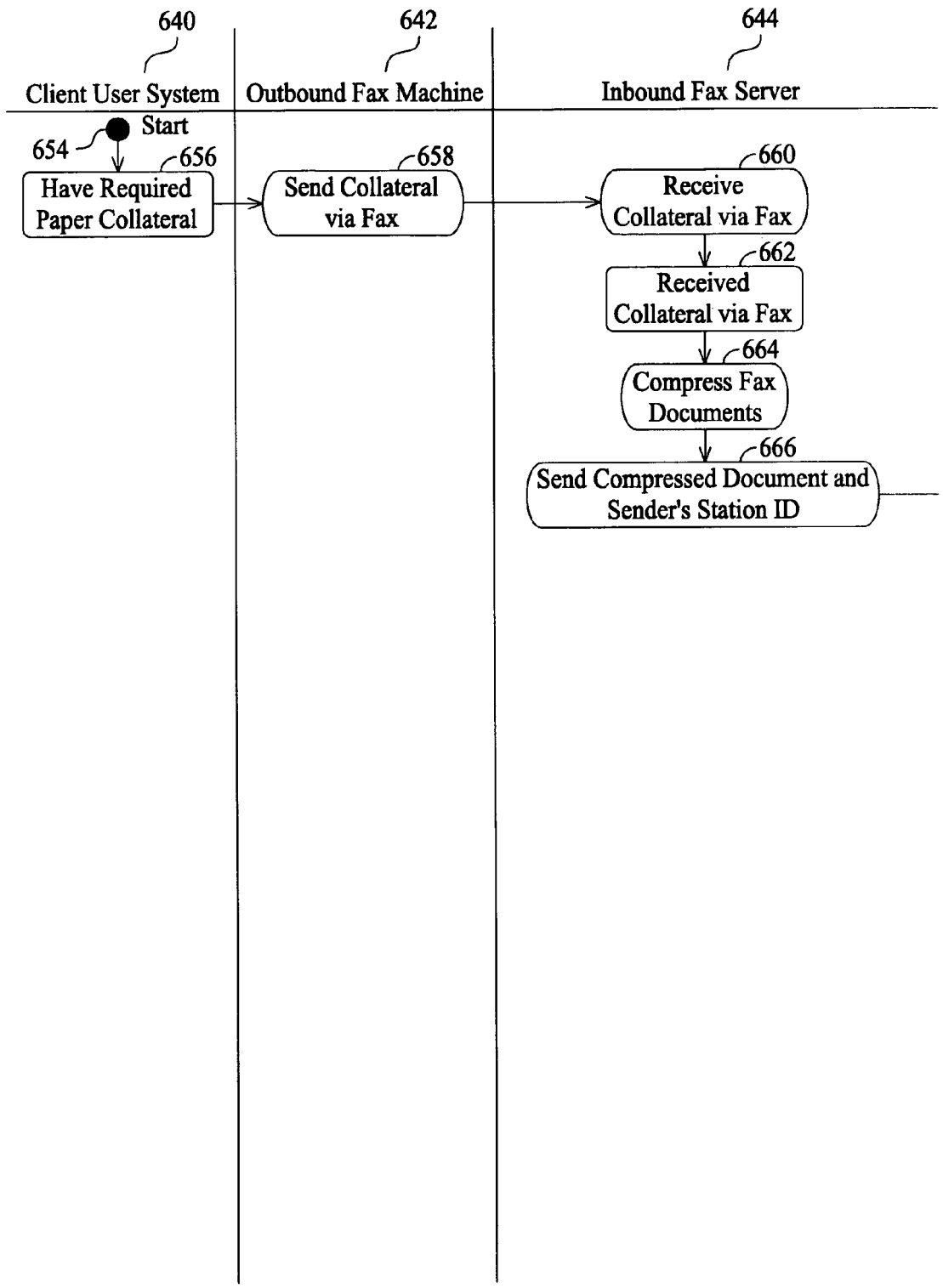
FIG. 22A    FIG. 22B →

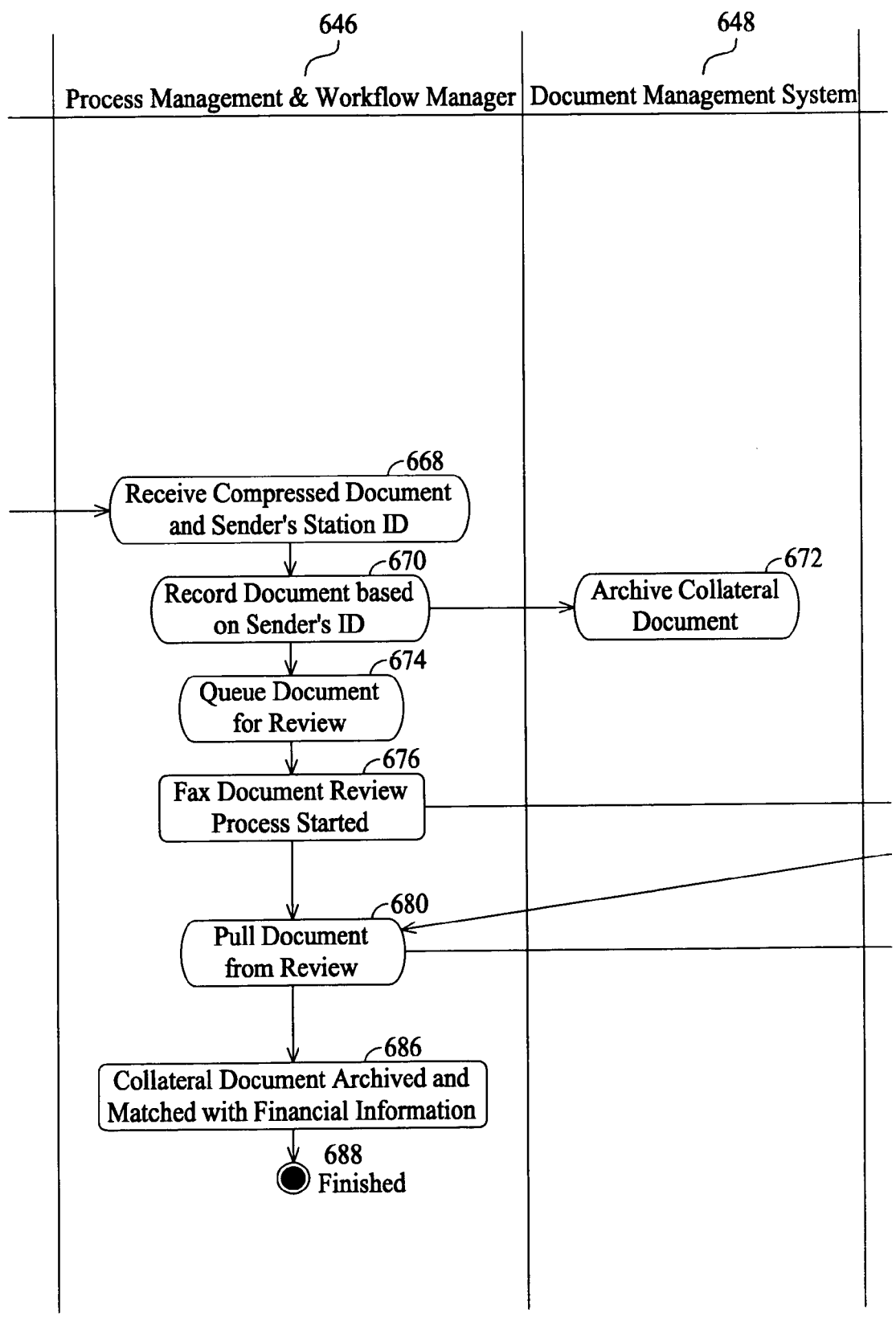
FIG. 22A ← FIG. 22B FIG. 22C →

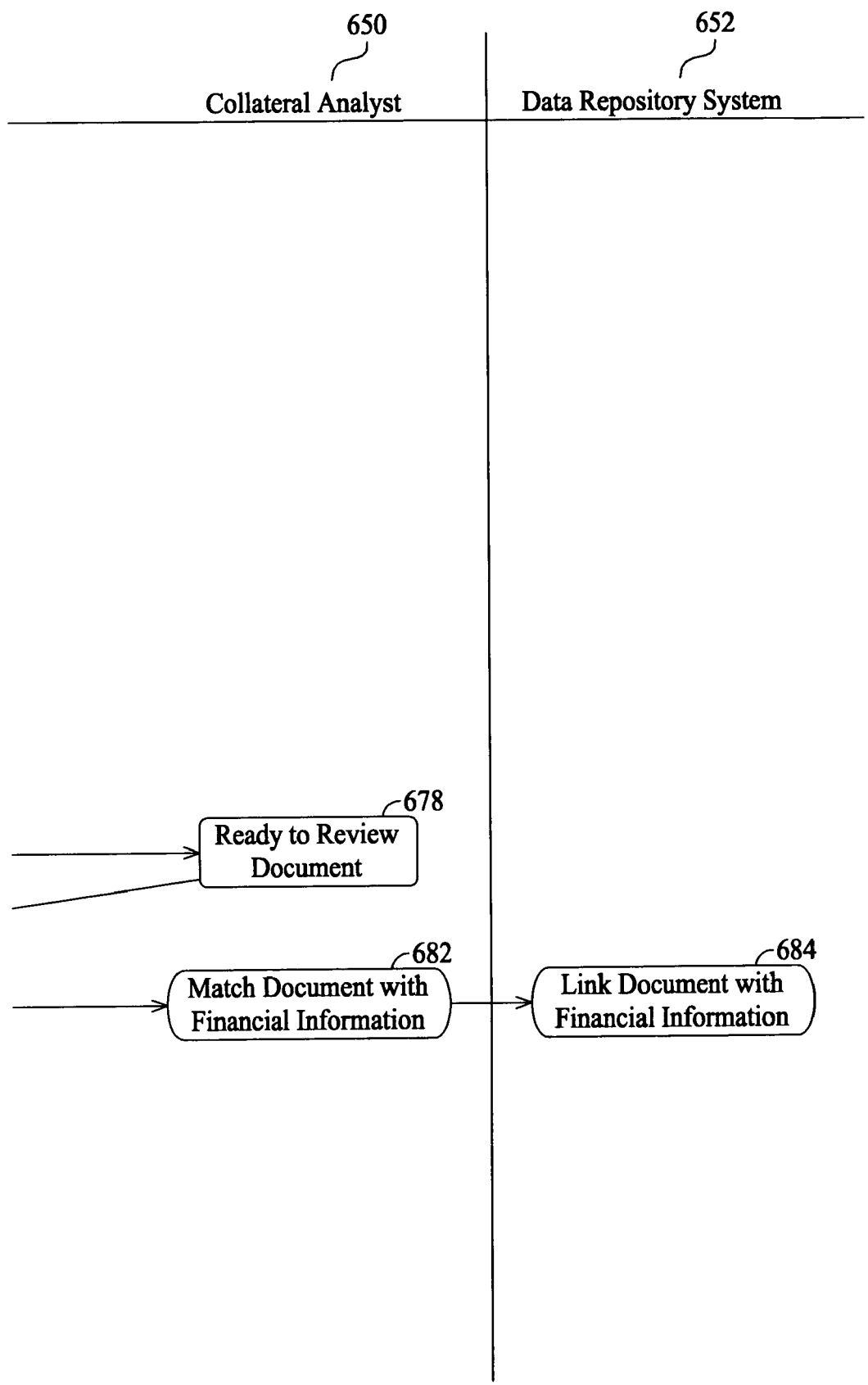

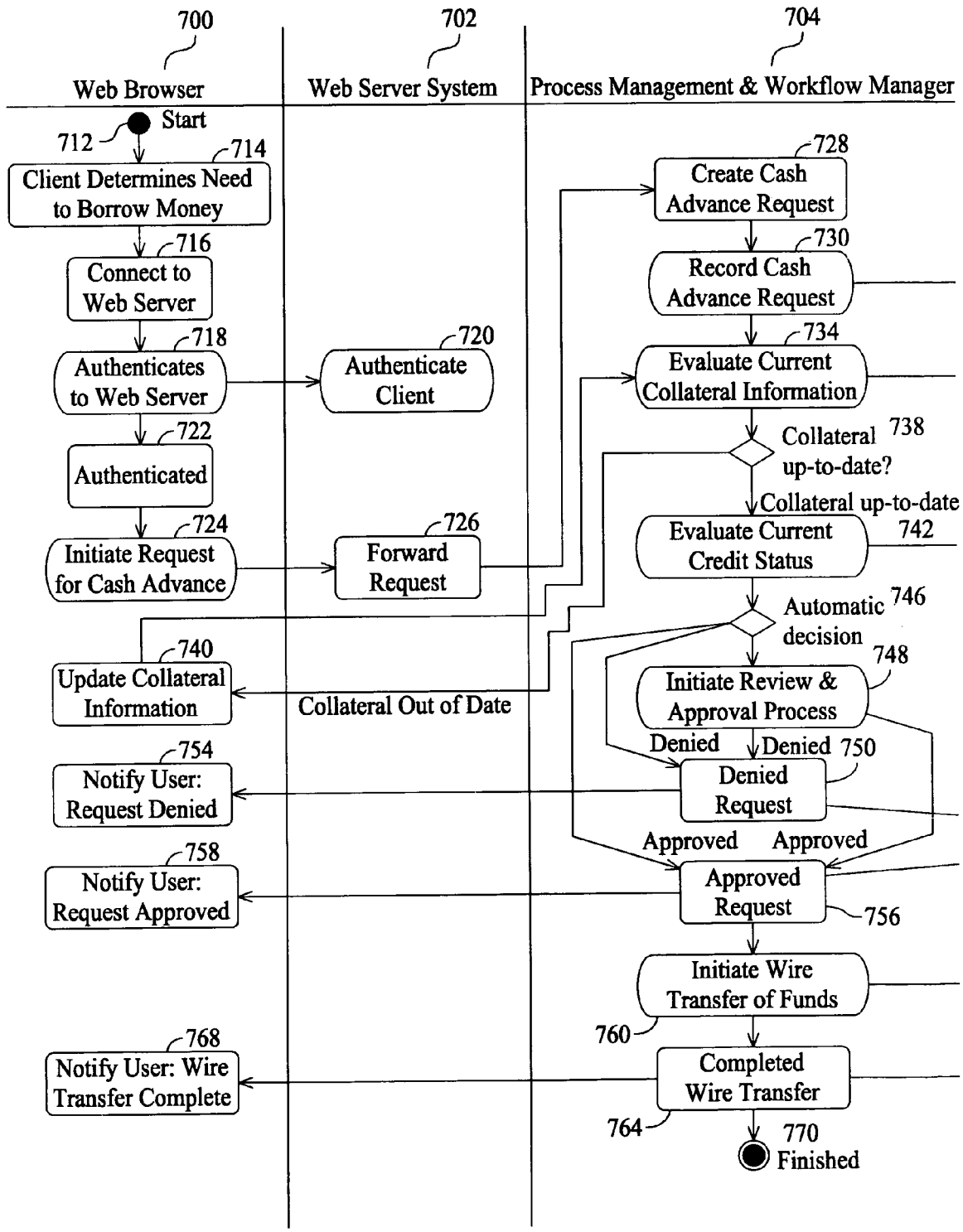
FIG. 23A   FIG. 23B →

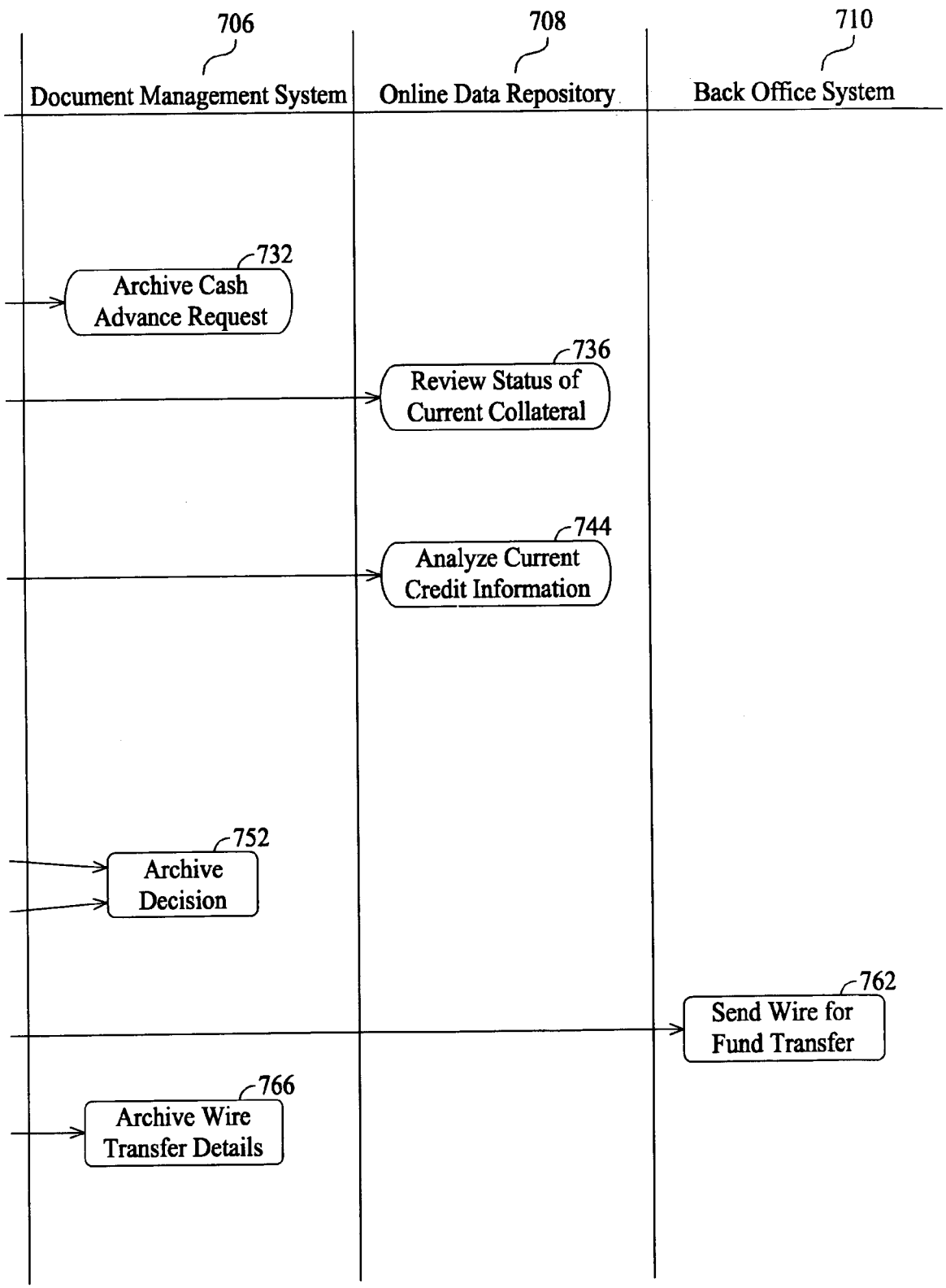

METHODS AND APPARATUS FOR SUBMITTING INFORMATION TO AN AUTOMATED LENDING SYSTEM

BACKGROUND OF THE INVENTION

This invention relates generally to lending and, more particularly, to methods and apparatus for automating lending processes.

Managing financial risk in lending often requires closely monitoring the financial status of borrowing customers. Such monitoring sometimes requires extensive financial reporting by the borrowing customer, such as tracking accounts receivables, account payables, and inventory. In addition, a lender typically analyzes each such financial report. Analysis of the financial reports by the lender sometimes requires extensive resources, and results in delays by the lender in granting credit to the borrowing customer.

To speed up lending processes, and to comply with reporting requirements, borrowers utilize facsimile and overnight delivery of information. In addition, reports are sometimes transmitted electronically, e.g., via e-mail or by conventional mail on a floppy disk. Electronic transmissions using fixed file formats for invoice information also are used in "factoring" type loans.

Although information can be more quickly delivered using a facsimile, overnight delivery, or electronic transmission, the reports must still be managed and analyzed. Such document management and analysis requires extensive resources and sometimes result in delays in the lending process or not analyzing all the information, which increases potential for issues and risk, and leads to added costs.

BRIEF SUMMARY OF THE INVENTION

The present invention, in one aspect, includes systems and processes for lending that utilize integrated Internet-based electronic reporting and workflow process management. The system is configured to facilitate electronic submission of financial reports from accounting systems using native reporting tools, automated extraction of financial information from the submitted reports, on-line requests for credit, document management and business process automation, automated risk assessment, and web-based financial reporting for both internal and external system users.

BRIEF DESCRIPTION OF THE DRAWINGS

FIGS. 22A–22C show an activity diagram for facsimile-based client report submission.

FIGS. 23A–23B show an activity diagram for processing cash advance requests.

DETAILED DESCRIPTION OF THE INVENTION

Exemplary embodiments of systems and processes that facilitate integrated Internet-based electronic reporting and workflow process management are described below in detail. The systems and processes facilitate, for example, electronic submission of financial reports from accounting systems using native reporting tools, and automated extraction of financial information from the submitted reports, on-line requests for credit, document management and business process automation, automated risk assessment, and web-based financial reporting for both internal and external system users.

The systems and processes are not limited to the specific embodiments described herein. In addition, components of each system and each process can be practiced independent and separate from other components and processes described herein. Each component and process can be used in combination with other components and processes.

System Architecture

Figure 1:
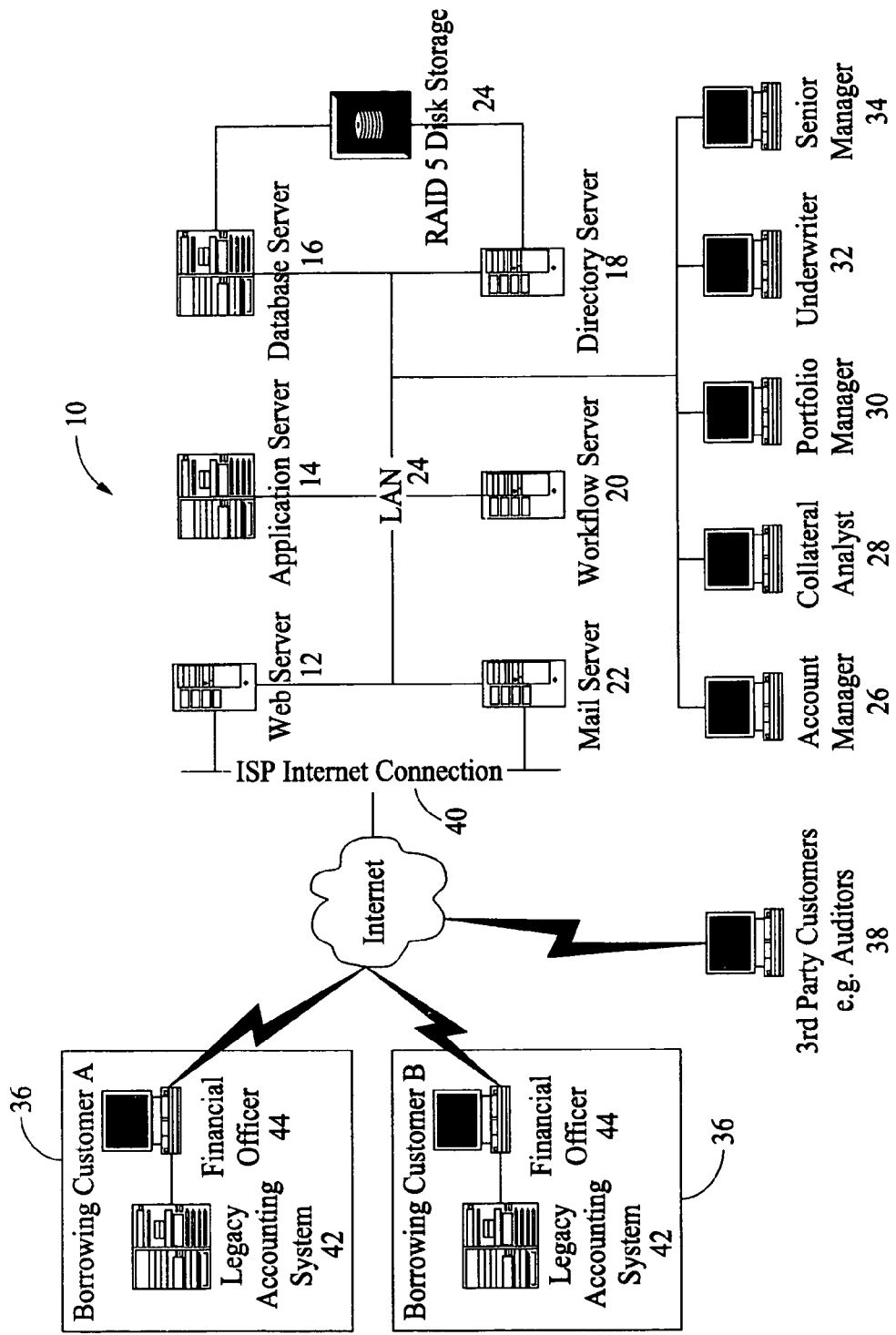
FIG. 1 is a block diagram of an exemplary embodiment of a server architecture.

Referring now to the drawings, FIG. 1 is a block diagram of an exemplary embodiment of a server architecture of a lending system 10. As illustrated in FIG. 1, system 10 includes a web server 12, an application server 14, a database server 16, a directory server 18, a workflow server 20, and a mail server 22. A disk storage unit 24 is coupled to database server 16 and director server 18. Servers 12, 14, 16, 18, 20, and 22 are coupled in a local area network (LAN) 24. In addition, an account manager work station 26, a collateral analyst work station 28, a portfolio manager work station 30, an underwriter work station 32, and a senior manager work station 34 are coupled to LAN 24. Alternatively, work stations 26–34 are coupled to LAN 24 via an Internet link.

Each work station 26, 28, 30, 32, and 34, in the exemplary embodiment, is a personal computer including a web browser. Although the functions performed by the account manager, collateral analyst, portfolio manager, underwriter, and senior manager typically are illustrated as being performed at respective work stations 26, 28, 30, 32, and 34, such functions can be performed at one of many personal computers coupled to LAN 24. Work stations 26, 28, 30, 32, and 34 are illustrated as being associated with separate functions only to facilitate an understanding of the different types of functions that can be performed by individuals having access to LAN 24.

Web server 12 and mail server 22 are configured to be communicatively coupled to respective borrowing customers 36 and to third party customers, e.g., auditors, 38 via an ISP Internet connection 40. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN, a local area network could be used in place of the WAN.

In the exemplary embodiment, each borrowing customer 36 has a legacy accounting system 42 coupled to a financial officer work station 44. Work station 44 is configured to communicate with web server 12 and mail server 22. As used herein, the term legacy accounting system refers to a back office composite set of systems that perform accounting functions (e.g., general ledger, accounts receivable, accounts payable, inventory). Many different accounting systems currently are in use, or may be used, by borrowing customers.

Figure 2:
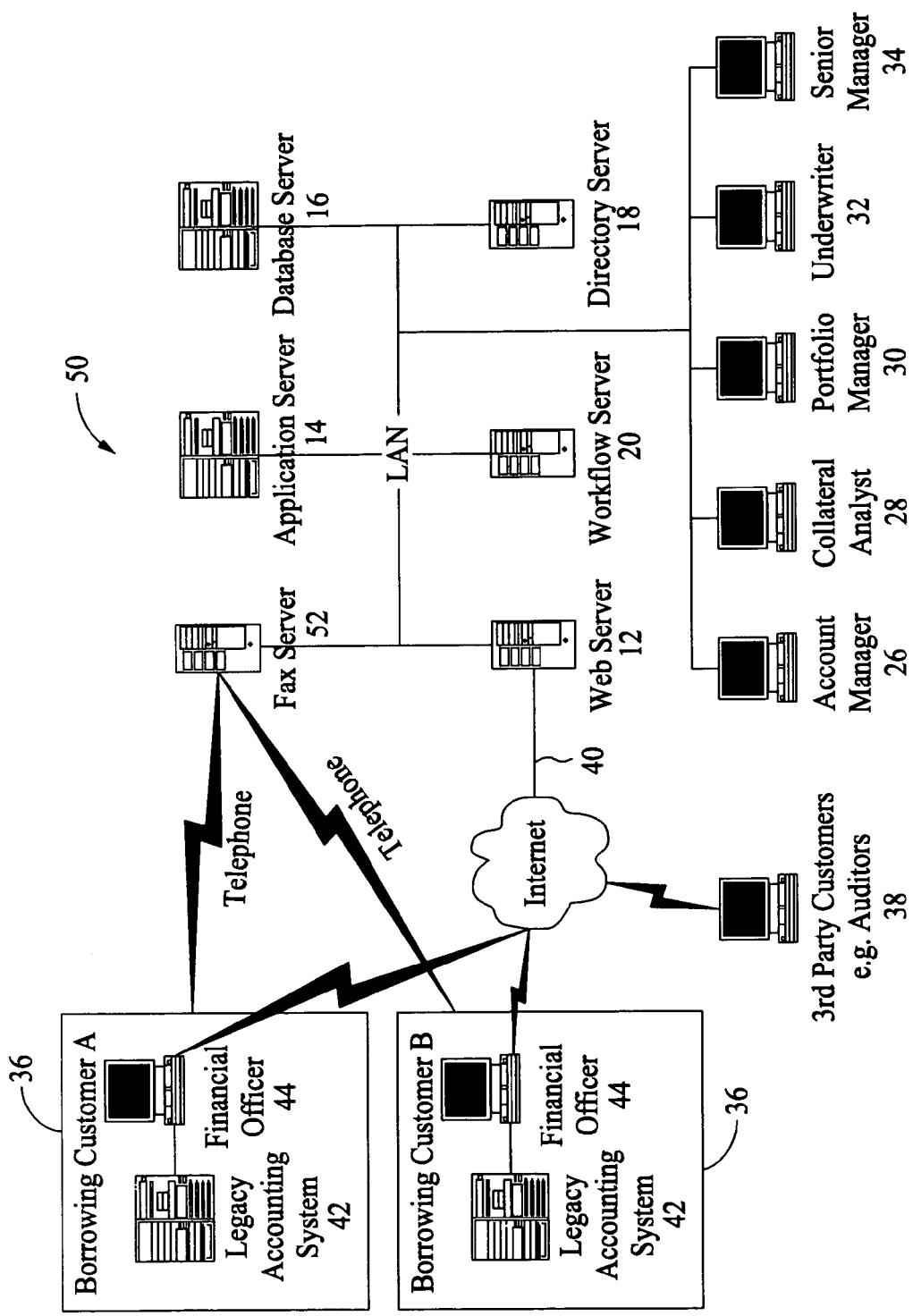
FIG. 2 is a block diagram of an alternative exemplary embodiment of a server architecture.

FIG. 2 is a block diagram of an alternative exemplary embodiment of a server architecture of a lending system 50. Components in system 50 identical to components of system 10 are identified in FIG. 2 using the same reference numerals as used in FIG. 1. System 50 differs from system 10 in that system 50 includes a fax server 52 coupled to LAN 24. In the embodiment illustrated in FIG. 2, fax server 52 communicates with borrowing customers 36 via a telephone link. Also, in system 50, the mail server is incorporated into web server 22.

The architectures of systems 10 and 50 are exemplary only. Other architectures are possible and can be utilized in connection with practicing the processes described below.

Figure 3:
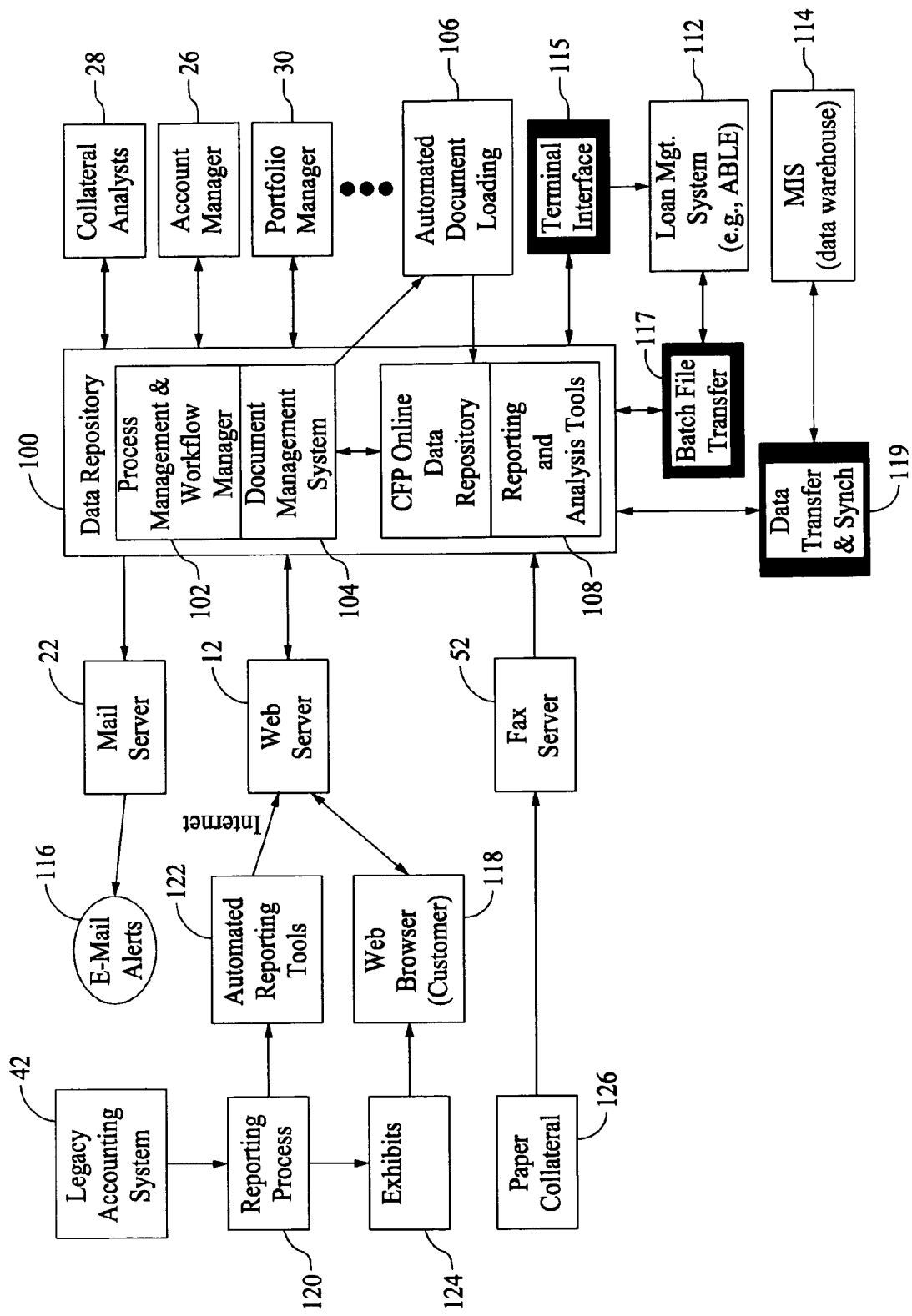
FIG. 3 is a functional block diagram based on the server architectures illustrated in FIGS. 1 and 2.

FIG. 3 is a functional block diagram of processes performed using the architectures of systems 10 and 50. More specifically, a data repository 100 holds business and financial information (e.g., electronic copies of original financial reports, borrowing client and customer directories, loan terms and conditions, and account balance and details). The information in data repository 100 is typically stored in a combination of relational databases, object oriented databases, and directory servers.

Process management and workflow manager 102 includes business processes and rules defined and implemented using workflow and process management servers. Process management and workflow manager 102 may, for example, be a commercially available system such as the system known as the Verve Embedded Workflow System. Business activities (e.g., financial reporting and cash advance requests) are conducted according to these defined processes and procedures. System users participate in these processes in accordance with their roles and responsibilities, i.e., authorization levels, as described below in more detail. Of course, infrastructure other than workflow and process management servers can be used for performing these functions.

A document management system 104 collects and manages financial reports. Collateral and associated business process activities are archived in electronic form for later reference (e.g., for process and other business audits, and for disaster recovery) by system 104.

Automated document loading 106 enables information extraction from financial reports submitted by borrowing customers provided in arbitrary electronic formats. The financial reports are converted from arbitrary document formats to predefined formats for use in the automated analysis and reporting processes. An exemplary system for performing such functions is described below with reference to print scraping. The conversion process involves detecting the report type, mapping and translating the report information in to a standardized form, populating the online data repository with the financial details and summary information, reconciliation of financial information, and handling any exceptions or error conditions that may be encountered in the conversion process. Each borrowing client may have a unique set of reporting formats with unique mapping and translation processes. Examples of commercially available mapping and translation systems include Data Junction, Mercator, and Monarch.

Reporting and analysis tools 108 utilize business-specific process parameters and borrowing client financial information to drive the automated risk analysis and reporting processes. Reporting software that include risk analysis tools include SQR server (SQRIB) and Business Objects (WEBI), which are well known and commercially available. This information is used to make business decisions (e.g., extend or tighten credit for borrowing customers). Processing associated with such activities is described below in detail.

Mail server 22 dispatches e-mail notifications. Server functionality may be performed using, for example, commercially available software such as Microsoft Exchange, Netscape Messenger, Lotus Notes, or UNIX SMTP mail. Any notification system such as voice mail and fax, in addition to or as a substitute for, e-mail notifications, also can be used.

Web server 12 facilitates interactions with system users, e.g., borrowing customers, and internal users such as account managers, collateral analyst, and portfolio managers. Client communications are handled by commercially available software such as Web browsers and other application software (e.g., network enabled print drivers). Of course, e-mail systems also can be used for client communications.

Fax server 52 receives collateral information from customers that the customers have in paper form (e.g., bills of lading, paper copies of invoices) and then routes this information in electronic form to data repository 100, e.g., to the process management and workflow manager 102. Additional details regarding fax server 52 are set forth below.

Loan management system 112, such as the commercially available loan management system known as ABLE, and data warehouse 114, such as an internal data warehouse, refer to back office systems and related operations. Specifically, the back office system is used to manage and track financial deals with borrowing customers, and system 112 uses terminal interfaces 115 to interact with users and batch file interfaces 117 to communicate with other back office applications. Data warehouse 114 provides a business data warehouse and reporting infrastructure 119.

E-Mail alerts 116 notify system users of pending information and/or actions that either require attention (e.g., review and approval actions) or that may be of interest (e.g., risk assessment reports). Web browser 118 enables user interaction with, for example, data repository 100. Commercially available web browsers, such as Netscape Navigator, Communicator and Microsoft Internet Explorer, can be utilized.

Legacy account system 42 refers to an internal accounting system used by a borrowing customer. There are several hundred different types of commercial accounting packages in use, as well as numerous instances of custom built accounting systems.

Reporting process 120 involves the use of various reporting tools which are typically integrated with legacy accounting system 42 to generate a variety of financial reports (e.g., accounts receivable, accounts payables, sales journal, inventory). The types of reports and corresponding report formats used by borrowing customers vary widely.

Automated reporting tools 122 integrate with legacy accounting system 42 to handle the electronic delivery of the required financial reports. Automated reporting tools 122 are integrated with reporting process 120 and may be invoked manually by a person acting on behalf of the borrowing customer, or automatically in accordance with defined business rules (e.g., daily, weekly, or monthly reporting schedules).

Exhibits 124 are typically manually generated summaries of current financial information that a client records. Exhibits 124 are used to simplify data entry into the back office systems. Paper collateral 126 refers to paper copies associated with business transactions (e.g., invoices, bills of laden) required to document and later verify transactions during borrowing client audits as well as in other fraud detection processes. The automated and electronic based systems and processes described herein facilitate rendering manually generated exhibits as obsolete.

Information Models

Set forth below are models identifying the data/object structures for use in systems 10 and 50. The models are exemplary only, and additional models and model structures can be used. The models are illustrated in FIGS. 4–13 in the universal modeling language (UML).

Figure 4:
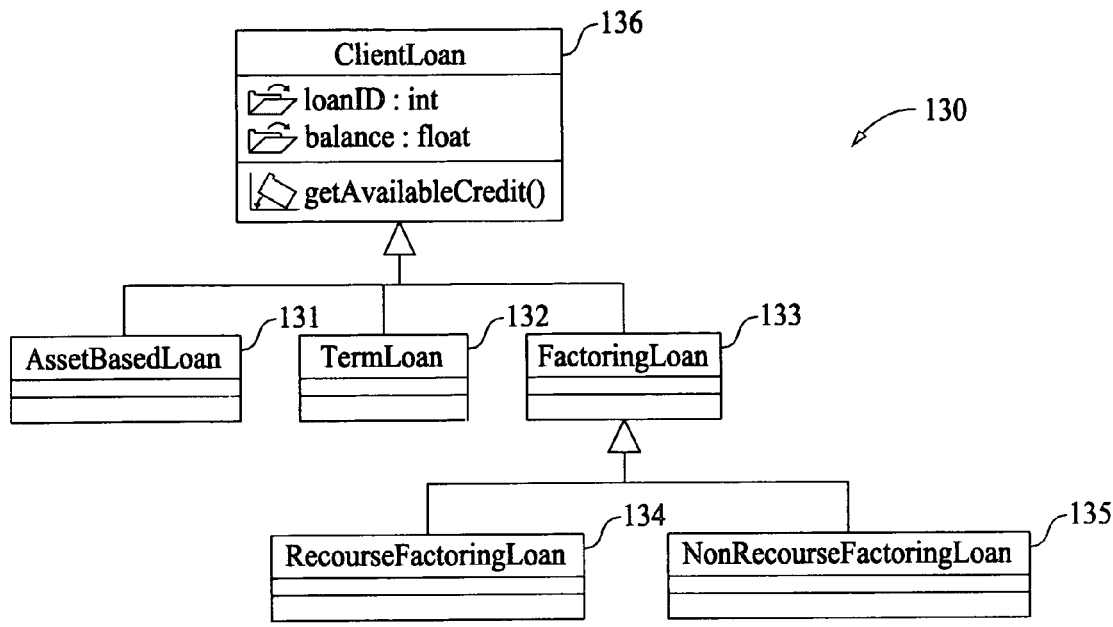
FIG. 4 is a class diagram for a general information model.

Referring again particularly to the drawings, FIG. 4 is a class diagram illustrating a general information model 130. As shown in FIG. 4, there are a variety of loan types, e.g., asset based loan 131, term loan 132, factoring loan 133. Some loan types, such as factoring loan 133, have further sub-classes, e.g., recourse factoring loan 134 and non-recourse factoring loan 135. Each loan type has its own requirements in terms of defining collateral, computing availability, payment, and processing terms, for example. Additional loan types can be added to the system by sub-classing a ClientLoan object 136 and building any additional classes required to define and track the loan.

Figure 5:
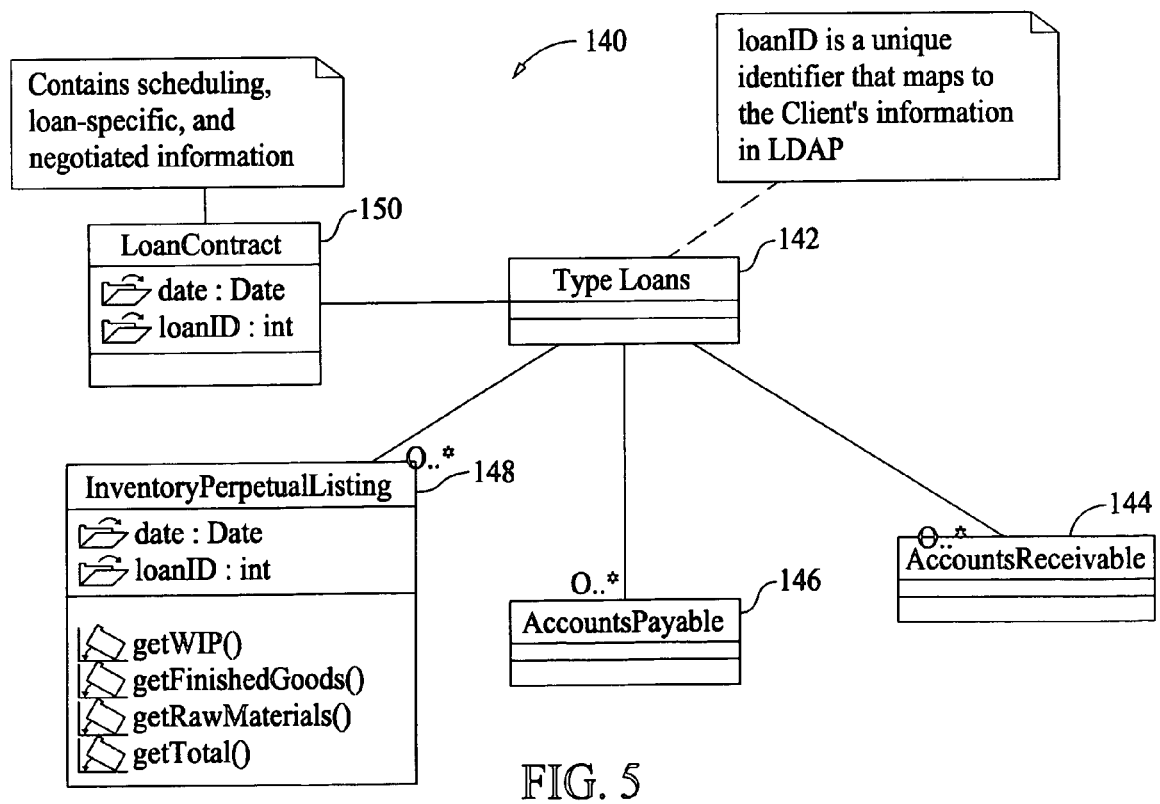
FIG. 5 is a class diagram for an asset based loan information model.

FIG. 5 is a class diagram for an asset based loan (ABL) information model 140. In ABL type loans 142, clients are advanced money based on current accounts receivable 144, accounts payable 146, and inventory information 148. Accounts receivable 144, accounts payable 146, and inventory objects 148 are populated based on data extracted from reports generated by the legacy accounting system. Loan information is contained in a loan contract object 150. Defined loan covenants such as turn time, concentration, and ineligibles also are contained in object 150.

Figure 6:
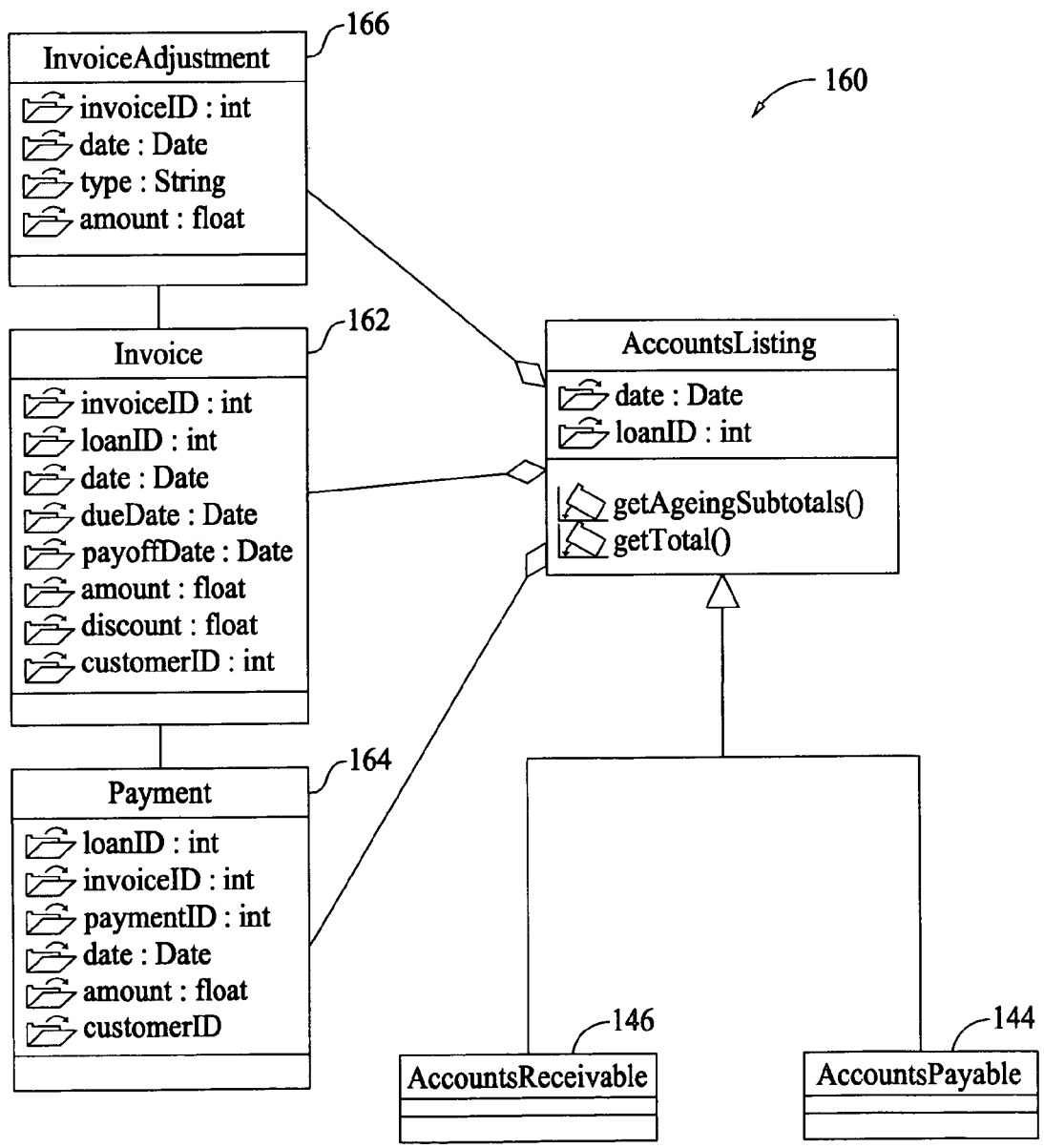
FIG. 6 is a class diagram for a core account model.

FIG. 6 is a class diagram for a core account model 160. The classes of data illustrated in FIG. 6 are used to store detailed invoice 162 and payment 164 information, as well as implement reconciliation, e.g., invoice adjustments 166, and other low-level analysis and reporting processes.

Figure 7:
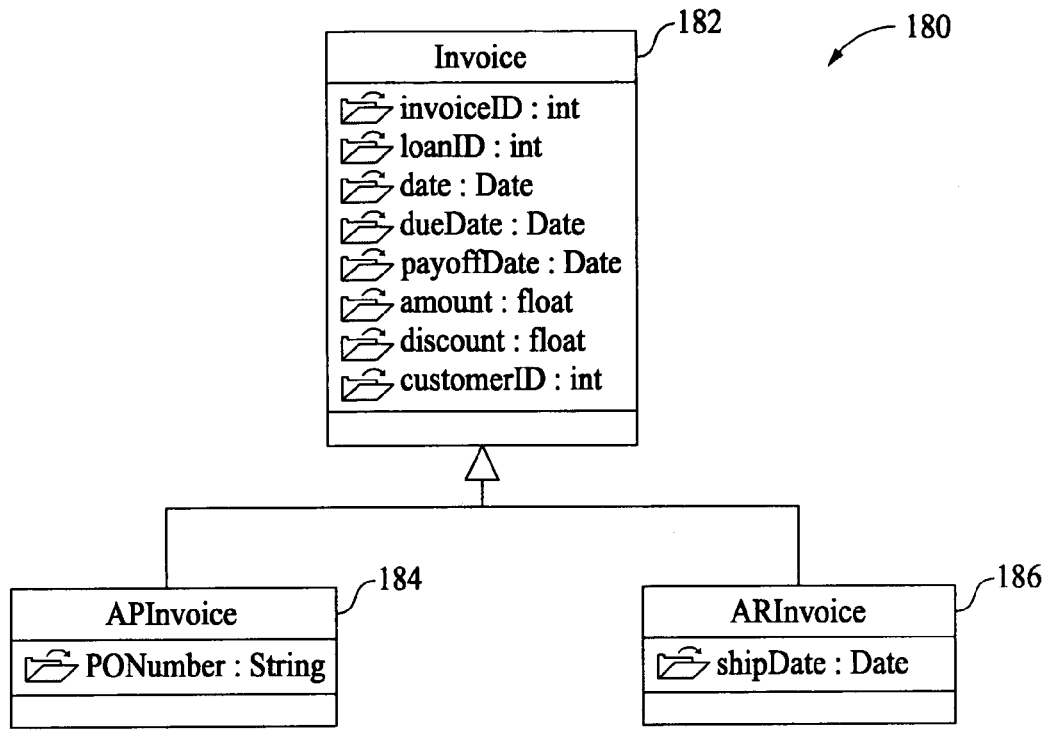
FIG. 7 is a class diagram for an invoice model.
Figure 8:
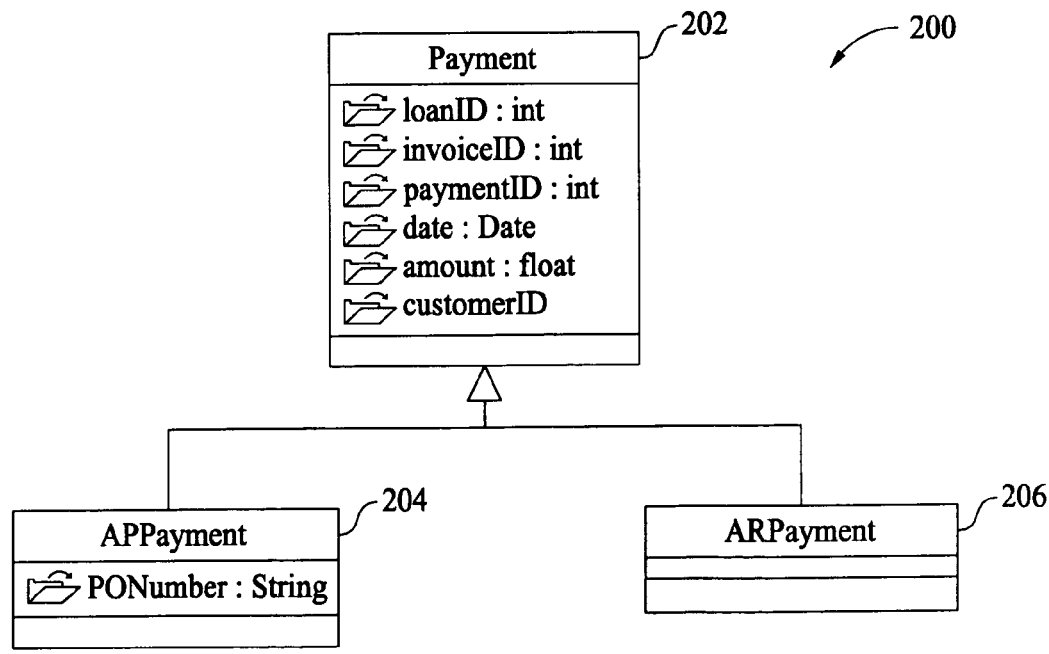
FIG. 8 is a class diagram for a payment model.

FIG. 7 is a class diagram for an invoice model 180, and FIG. 8 is a class diagram for a payment model 200. The invoice 182 and payment 202 objects, e.g., accounts payable and receivable invoice objects 184 and 186, and accounts payable and receivable payment objects 204 and 206, are sub-classes that support the specific requirements of the accounts receivable and accounts payable information.

Figure 9:
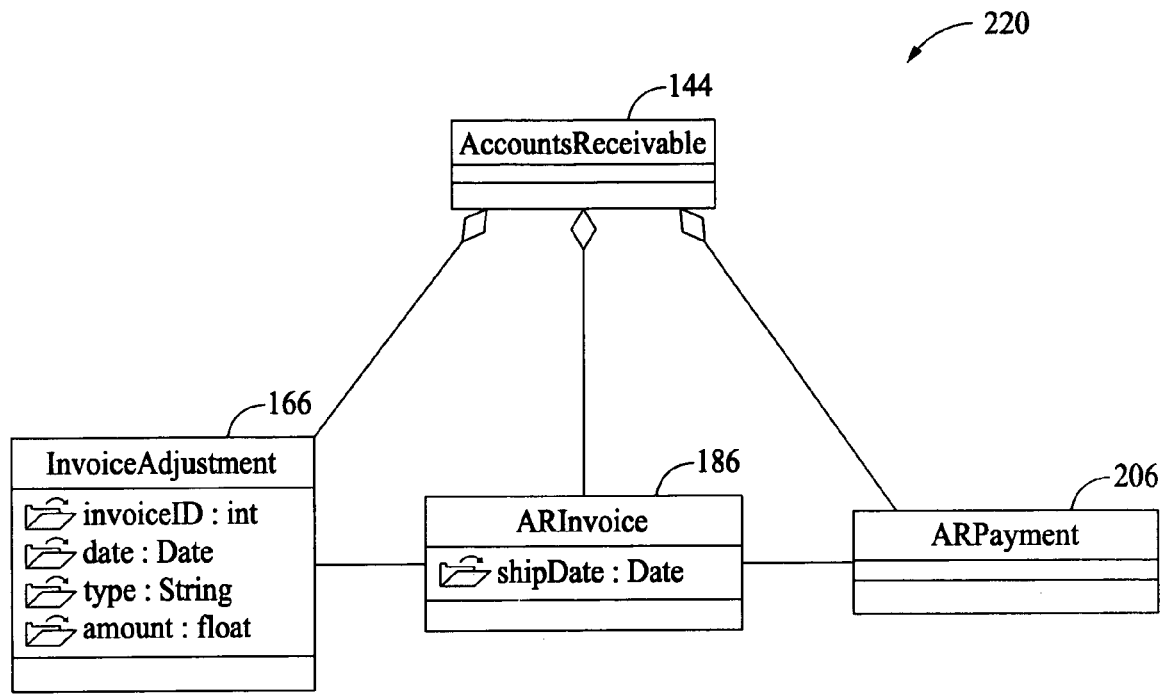
FIG. 9 is a class diagram for an accounts receivable model.

FIG. 9 is a class diagram for an accounts receivable model 220. The InvoiceAdjustment 166, ARInvoice 186, and ARPayment 206 objects are used to track accounts receivable information 144 and to reconcile invoices and payments. These objects are also used by higher level analysis and reporting tools (e.g., to determine ineligibles, for fraud detection, risk management, and on-site client audits).

Figure 10:
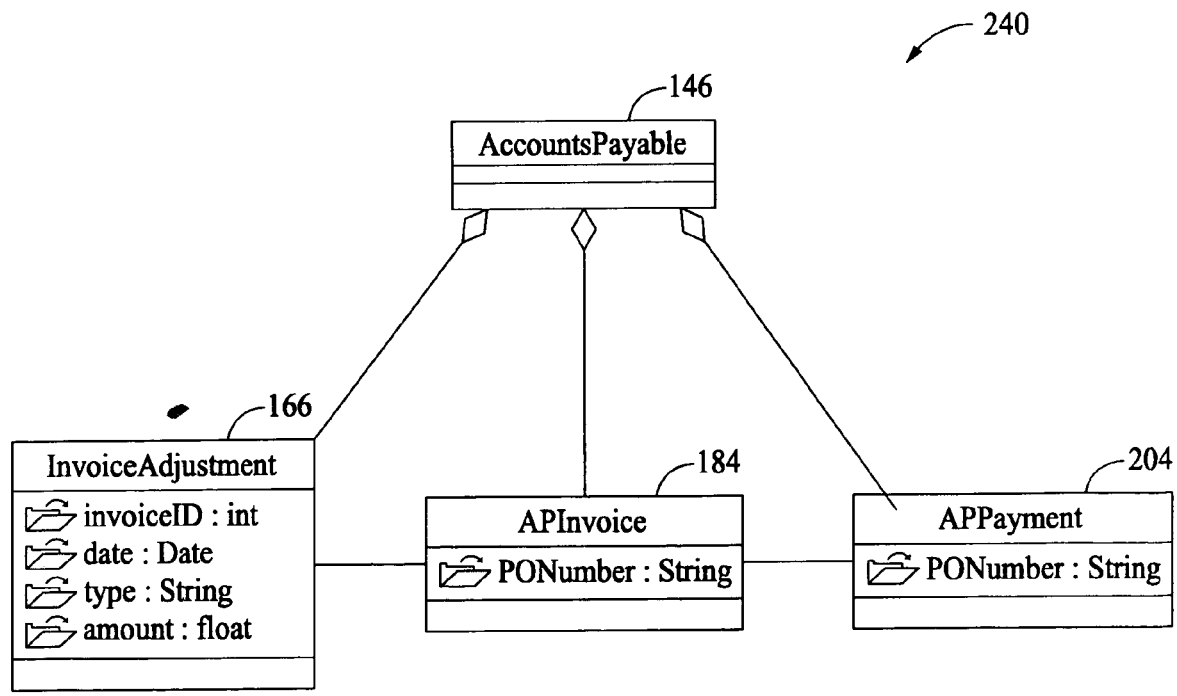
FIG. 10 is a class diagram for an accounts payable model.

FIG. 10 is a class diagram for an accounts payable model 240. The InvoiceAdjustment 166, APInvoice 184, and APPayment 204 objects are used to track accounts payable information 146 and to reconcile the invoices and payments. These objects are also used by higher level analysis and reporting tools (e.g., for fraud detection, risk management, and on-site client audits).

Figure 11:
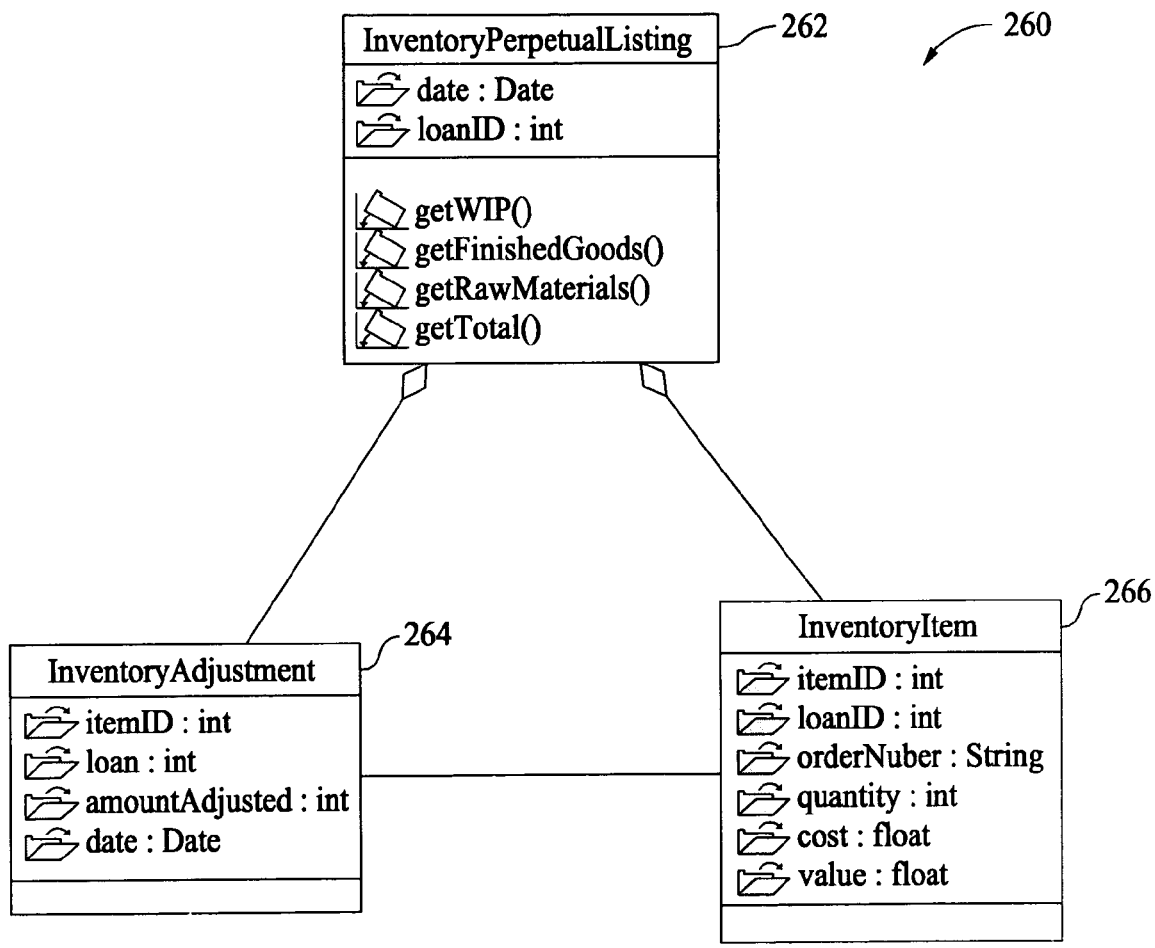
FIG. 11 is a class diagram for an inventory model.

FIG. 11 is a class diagram for an inventory model 260. The InventoryPerpetualListing 262, InventoryAdjustment 264, and InventoryItem 266 objects are used to track inventory information and to determine ineligible inventory items. These objects are also used by higher level analysis and reporting tools (e.g., for fraud detection, risk management, and on-site client audits).

Figure 12:
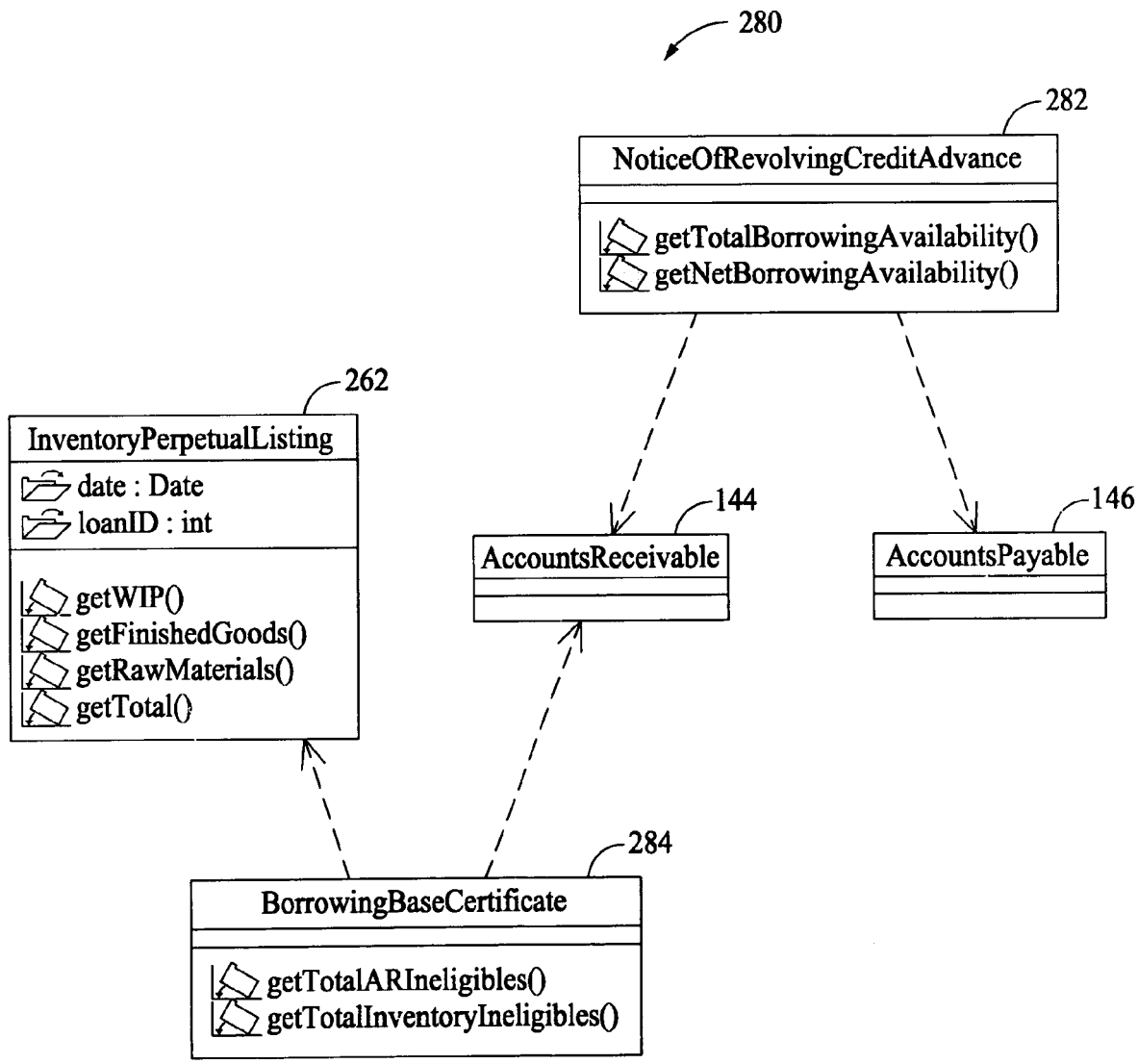
FIG. 12 is a class diagram for relationships between models for monitoring accounts payable, accounts receivables, ineligibles, and inventory.

FIG. 12 is a class diagram 280 for relationships between models for monitoring accounts payable 146, accounts receivables 144, and inventory 262. A NoticeOfRevolvingCreditAdvance 282 object is used to process cash advances based on current loan availability for borrowing. A BorrowingBaseCertificate 284 object is used to monitor accounts payable, accounts receivable, ineligibles, and inventory to update and track the current ABL loan availability for borrowing.

Electronic Submission Process

The client interface enables use of a diverse set of customer accounting systems into an e-Commerce infrastructure, which streamlines the relationship between the lender and customers with revolving lines of credit. Systems 10 and 50 are configured to enable both manual and electronic submission of data. The electronic submission of the financial data reduces the cost of monitoring the customer, reduces the number of steps that human error can be introduced in, and provides the lender with the opportunity to perform in-depth analysis of the customer data across their entire portfolio. This increase in efficiency allows the lender to operate with lower overhead and provide a better understanding of risk exposure and better insight into risk mitigation.

With known present paper based system, customers generate reports from their accounting systems on a regular basis and summarize those reports by manually scribing information onto supplementary exhibits. The present system allows users to submit reports electronically to eliminate the need for customers to manually transcribe summary information. However, the automatic generation of exhibits from electronically submitted reports and the ability to tie that information to the report details depend on the system ability to programmatically extract the information from the electronic reports. Since the reports are generated from a diverse set of accounting systems, the degree to which information can be automatically extracted depends on the reporting capabilities of the accounting systems and the ability to map and translate information from a customer defined formats to a system format.

With respect to electronic submission, either a fixed format for each of the required reports is defined, or translation services that map a customer defined format into a format understood by the system are utilized. By establishing a format for required reports, the ability to extract information from the customer submitted documents simply becomes a matter of programmatic extraction. Having standardized report formats assumes that the client accounting systems have the ability to generate custom reports, or have the ability to use third party reporting packages.

In the event that the customer is unable to control the format of their financial reports or is unable to comply with the format of the system report, there must be some facility to translate the customer report into an acceptable format. The translation services require that the customer format can be easily parsed and have relevant data extracted from the report.

The accounting system reports need to be electronically submitted to the system. There are a number of ways these reports can be submitted, which affect functionality and end user interaction. For example, the submission of reports can be accomplished by using a web browser, i.e., the HTTP transmission protocol. Other transmission protocols, such as FTP and SMTP also can be used. The use of a web browser, however, limits automating the reporting process. A more integrated approach to electronic document submission is through the use of desktop software. Desktop software provides tighter integration with the accounting system, as well as provides the ability to automate the reporting process.

With respect to a web browser, users generate the required reports and then export those reports from their accounting system into a format that can be processed by the system. The customer may automate the generation of the financial reports. However, the actual browser based submission of the reports is not automated. Integration with the accounting system depends on the ability to export reports to a file system that can be seen by a web browser (i.e. local or network file system). The loose integration with the accounting system provides the ability to serve the largest possible customer base. The actual submission of the electronic reports involves user interaction and is not automated.

Through the use of a virtual printer, users simply print the required reports from within their accounting system. Instead of generating paper output, the virtual printer submits the report electronically to the system. The virtual printer interface provides a tight integration with the accounting system, since the user actually submits the report electronically from within their accounting package. Additionally, the submission of the report is done at the point of review. The user views what he/she is about to submit. By sending the report to the virtual printer, the user confirms that the information is correct and up-to-date.

Customers also can be provided with a stand-alone application capable of electronically submitting a report on a file by file basis. If clients generate reports from a command line application, the clients couple the generation of the reports with electronic submission through the use of scripting. Clients then schedule the appropriate scripts to execute automatically to satisfy the reporting requirements. Provided that the client automatically schedules the report generation and submission, the entire reporting process occurs without user interaction.

With respect to alternative communications between a customer and the system, and in order to address the broadest client base, it is necessary to have several different accounting system interfaces. An interface definition is a pair-wise combination of report format and method for electronic submission. At the lowest level interface (Level I), the broadest spectrum of client base is addressed by having the loosest coupling to the accounting system. However, the loosest coupling requires the most user interaction. As the interface level increases, the accounting system will have a tighter coupling with the system, which provides increased functionality at the expense of decreasing the number of clients to which the interface may be applied.

The interface levels are defined below. Generally, many clients may initially start at the Level I interface. To achieve the benefits of the automated submission and analysis, the objective is to transition such clients from Level I to Levels IV and V as quickly as reasonably possible.

Level I—Customer Defined Reports, Manual Export and Exhibit Completion

Level II—System Defined Reports, Manual Export and Automated Exhibit Completion

Figure 13:
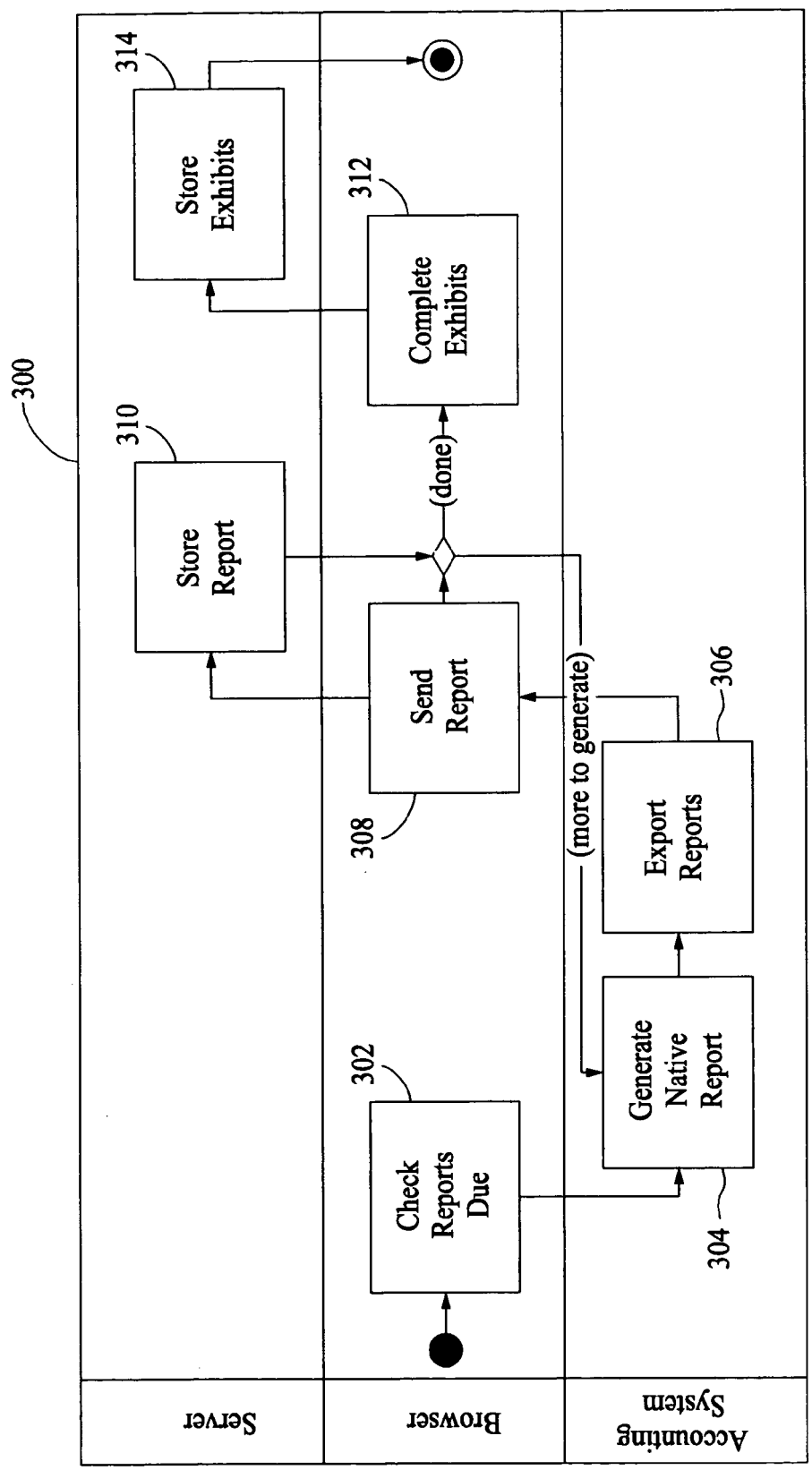
FIG. 13 is a block diagram of a print driver.

Level III—Customer Defined Reports, Manual Export and Automated Exhibit Completion Level IV—System Defined Reports, Integrating Reporting and Exhibit Completion Level V—Customer Defined Reports, Integrating Reporting and Exhibit Completion In FIGS. 13–17, operations are identified as being performed by accounting system 42, the browser in a customer-side computer (e.g., computer 44), and a server (e.g., servers 12–22). More specifically, FIG. 13 illustrates processing 300 for generating customer defined reports, and manual export and exhibit completion (Level I). The Level I interface depends on the client ability to export the reports from their accounting system to their local file system. Once the required reports are exported, the client can then submit the reports to the system using a standard web browser. During the submission process, the user identifies the report submitted and attaches the exported report to the web form (file upload). After submitting the required reports, the client then completes the corresponding exhibits, by transcribing summary information from the reports to another web form.

Specifically, at some time (after logging in), the user can check to determine whether reports are due 302. The user can enter their accounting system with the knowledge of what reports he/she must produce 304. After generating the desired report, the user then exports the report to their local file system (or one visible to the browser) 306. From the browser, the user selects to send the generated report 308. Since the report is being treated as an opaque object, the user must specify which report he/she is submitting, and attach the correct report to the form submission. The received report is stored 310 in a database, e.g., via database server 16. The reports are viewable by designated personnel. However, no attempt is made to programmatically extract any information from the report(s). Just after supplying with the appropriate reports, the user then fills out summary web form, which represent the current paper exhibits 312. The double entry is still required because no attempt is made to programmatically extract information from the documents. The exhibits are stored 314 for review by the appropriate personnel.

Figure 14:
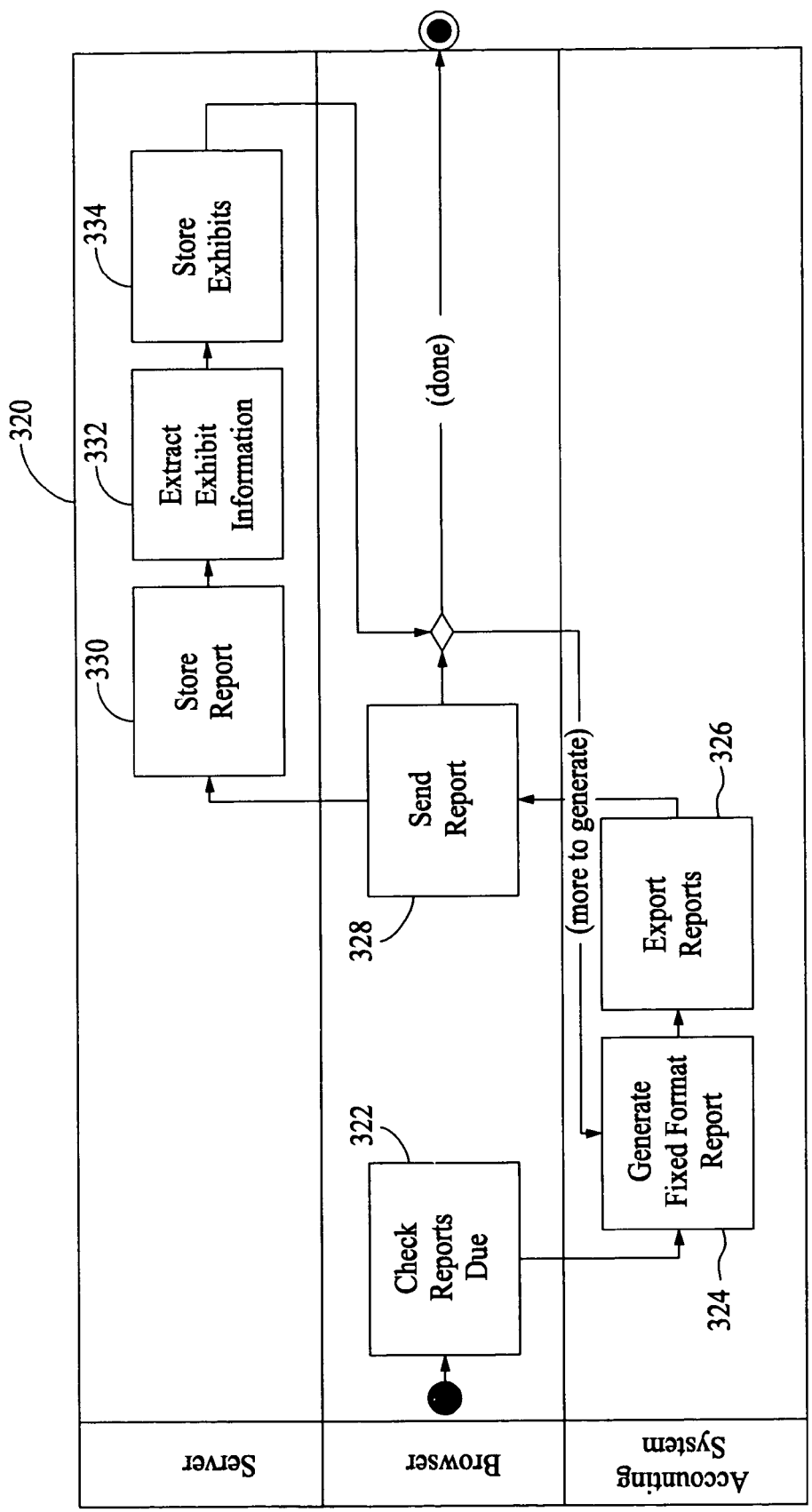
FIG. 14 is an activity diagram for generation of customer defined reports, and manual export and exhibit completion.

FIG. 14 illustrates processing 320 for generation of system reports, and manual export and automated exhibit completion (Level II). The Level II interface depends not only on the client ability to export the required reports from their accounting system to their local file system, it also depends on the accounting system ability to generate the reports in a specific format. Once the required reports are exported, the client can then submit the reports to the system using a standard web browser. During the submission process, the user simply attaches the exported report to the web form (file upload). Because the system defines the report format, it is possible to extract the information from the reports to automatically generate the supporting exhibits.

Specifically, at some time (after logging in), the user checks to determine whether reports are due 322. The user can enter their accounting system with the knowledge of what reports he/she must produce and must produce a report in the exact format specified 324. After generating the desired report, the user then exports the report to their local file system (or one visible to the browser) 326. From the browser, the user selects to send the generated report 328. The received report is stored 330 in a database. The reports are viewable by designated personnel. Exhibit information is then extracted 332 from the defined report format. The exhibits are stored 334 for review by the appropriate personnel. Exhibit information is then extracted 332 from the defined report format. The exhibits are stored 334 for review by the appropriate personnel.

Figure 15:
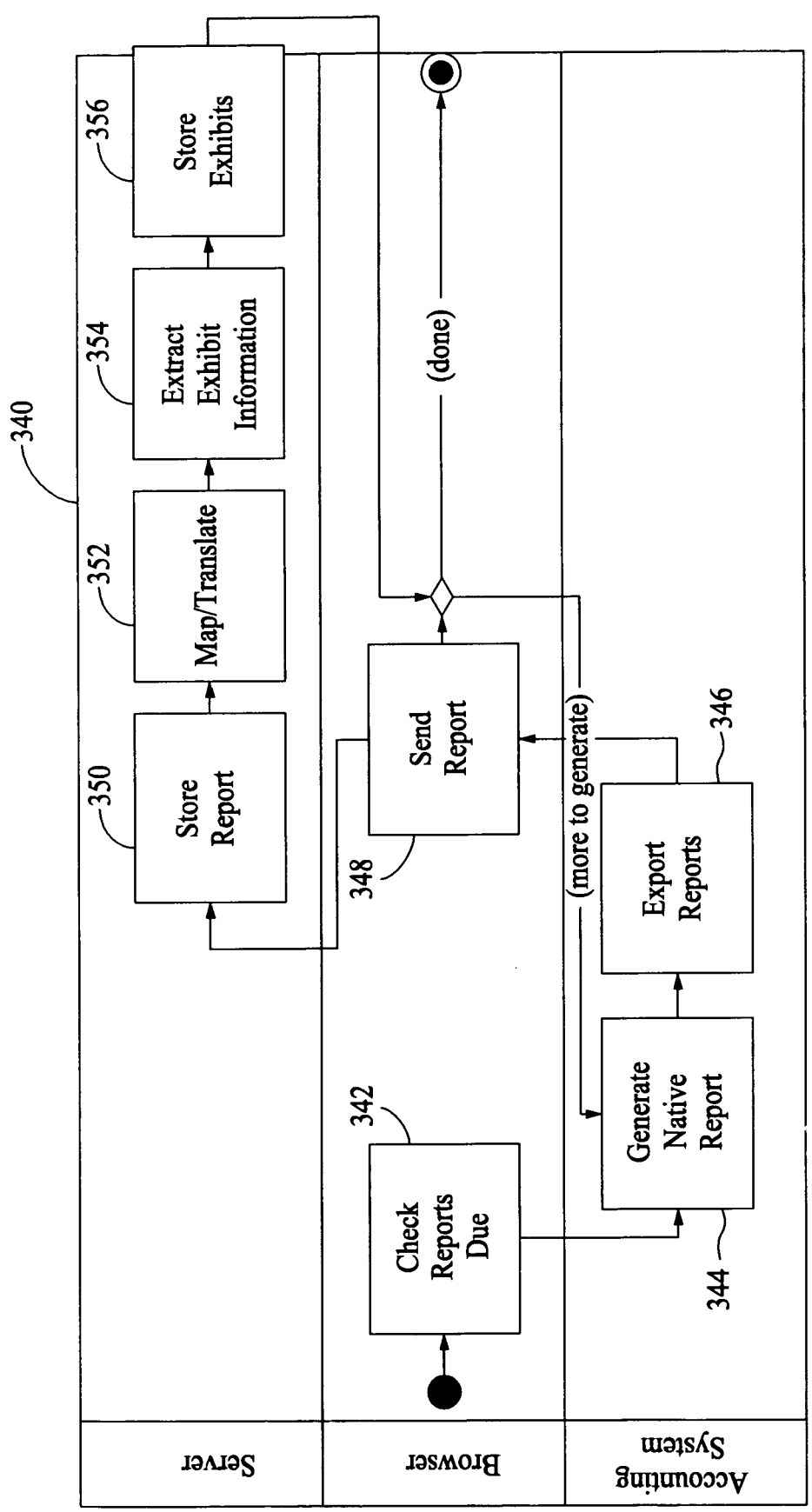
FIG. 15 is an activity diagram for generation of system reports, and manual export and exhibit completion.

FIG. 15 illustrates processing 340 for generation of customer defined reports, manual export, and automated exhibit completion (Level III). The Level III interface also depends on the client ability to export the required reports from their accounting system to their local file system. However, the client can use the reports which their accounting system already generates. Once the required reports are exported, the client can then submit the reports to the system using a standard web browser. During the submission process, the user simply attaches the exported report to the web form (file upload). The Level III interface requires that for every report type, from every client, that there is a translation service defined. The translation service allows the system to extract the information from the submitted reports to automatically generate the supporting exhibits.

Specifically, at some time (after logging in), the user checks to determine whether reports are due 342. The user can enter their accounting system with the knowledge of what reports he/she must produce 344. These reports are the same reports the customer already uses. After generating the desired report, the user exports the report to their local file system (or one visible to the browser) 346. From the browser, the user selects to send the generated report 348. The received report is stored 350 in a database. The reports are viewable by designated personnel. The report is translated 352, using a pre-defined map, into a format that can be used to extract exhibit information. Exhibit information is then extracted 354 from the report(s). The exhibits are stored 356 for review by the appropriate personnel.

Figure 16:
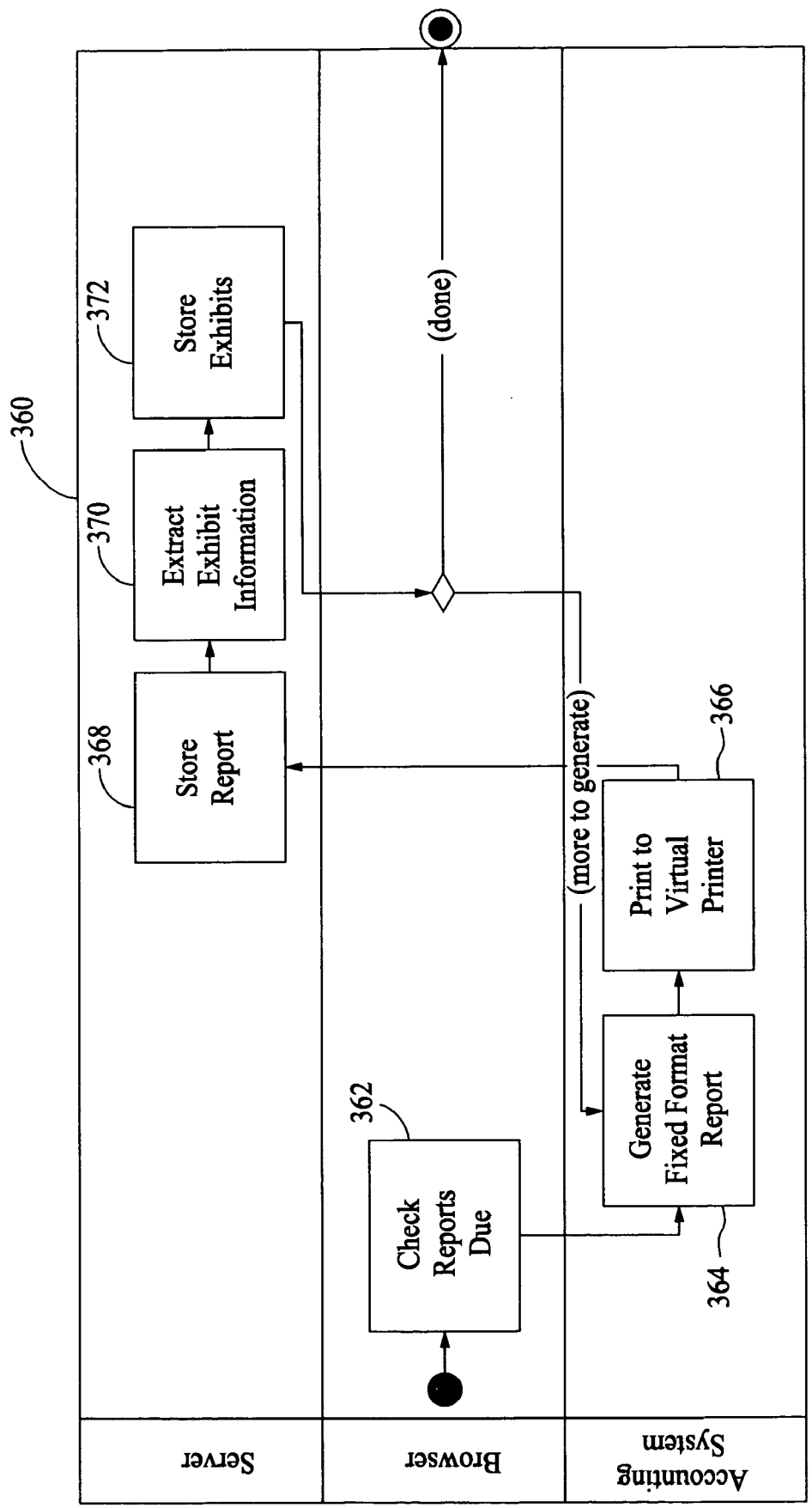
FIG. 16 is an activity diagram for generation of customer defined reports, manual export, and automated exhibit completion.

FIG. 16 illustrates processing 360 for generation of system reports, and integrating reporting and exhibit completion (Level IV). The Level IV interface does not require clients to export reports to their local file system. Reports are submitted to the system directly from within the user accounting system. The interface to the system is provided through the operating system print services. A virtual printer (e.g., virtual printer 400 described below) is defined which routes the reports directly to the system rather than generating any paper output. Because the system defines the report format, it is possible to extract the information from the reports to automatically generate the supporting exhibits.

Specifically, at some time (after logging in), the user checks whether reports are due 362. The user can enter their accounting system with the knowledge of what reports he/she must produce and produces a report in the exact format specified 364. After generating the desired report, the user then prints the report from within their accounting system. The printer the user chooses to send the report to is actually a virtual printer, having an output that is an electronic submission of the report 366. The received report is stored 368 in a database. The reports are viewable by designated personnel. Exhibit information is extracted from the report(s) 370. The exhibits are stored 372 for review by the appropriate personnel.

Figure 17:
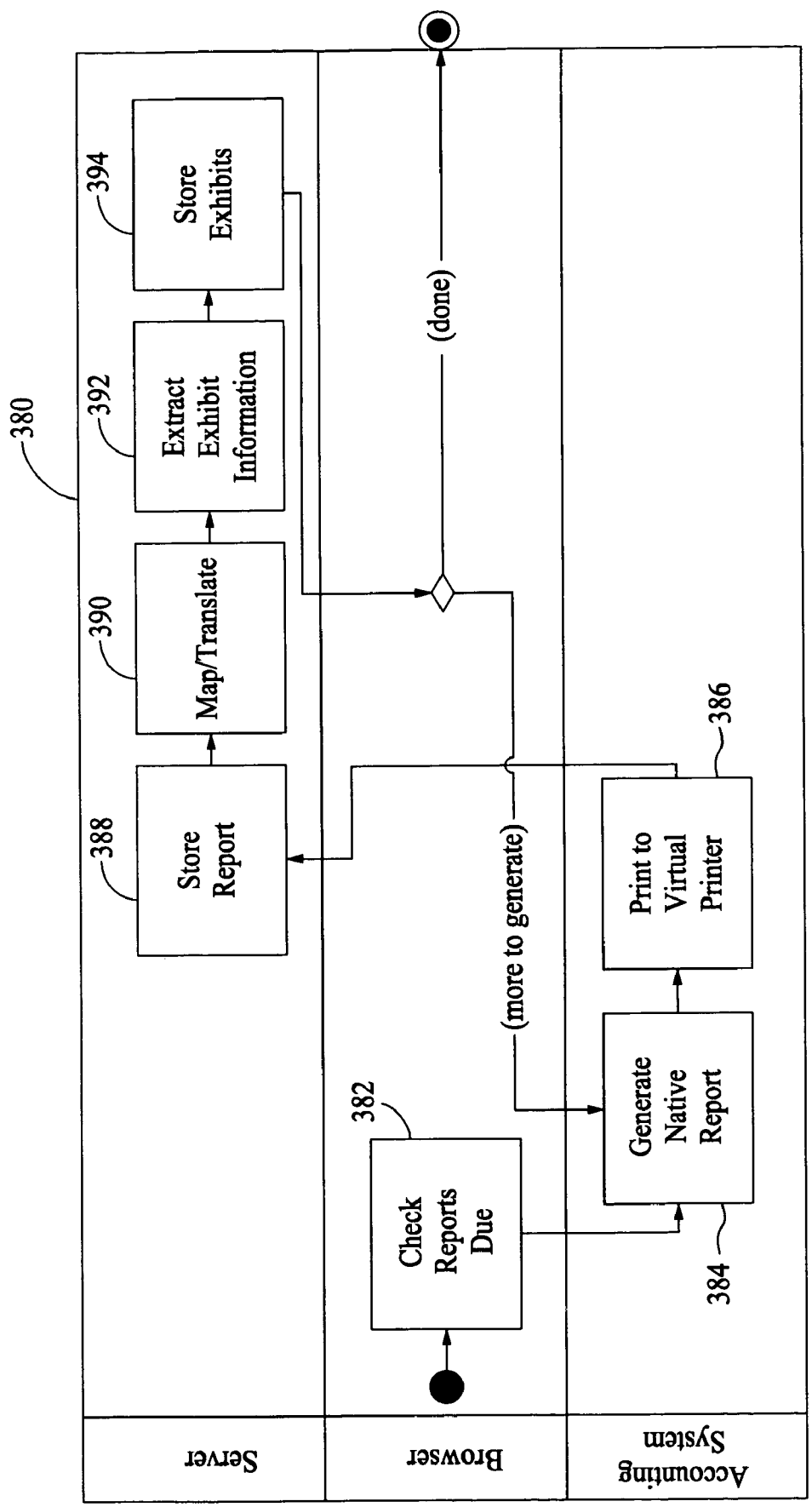
FIG. 17 is an activity diagram for generation of system reports, and integrating reporting and exhibit completion.

FIG. 17 illustrates processing 380 for generation of customer defined reports, and integrating reporting and exhibit completion (Level V). Similar to the Level IV interface, the Level V interface does not require clients to export reports to their local file system. Reports are submitted to the system directly from within the user accounting system. The interface to the system is provided through the print services of the operating system such as Windows, OS400, or UNIX print services. A virtual printer (e.g., virtual printer 400) is defined which routes the reports directly to the system rather than generating any paper output. The Level V interface requires that for every report type, from every client, that there is a translation service defined. The translation service allows the system to extract the information from the submitted reports to automatically generate the supporting exhibits.

Specifically, at some time (after logging in), the user checks whether reports are due 382. The user can enter their accounting system with the knowledge of what reports he/she must produce. These reports may be in the format they are already using 384. After generating the desired report, the user can then print the report from within their accounting system 386. The printer the user chooses to send the report to is actually a virtual printer, having an output that is an electronic submission of the report. The received report is stored 388 in a database. The reports will be viewable by designated personnel. The report is translated 390 and mapped into a format that can be loaded into data repository 100. Exhibit information is then extracted 392 from the report(s). The exhibits are stored 394 for review by the appropriate personnel.

Print Driver

Set forth below is a description of a print driver. Although the print driver is described herein in the context of financial lending processes, it should be understand that the print driver can be utilized in many other contexts. Generally, the print driver can be used in connection with interfacing with a client using any legacy system.

Figure 18:
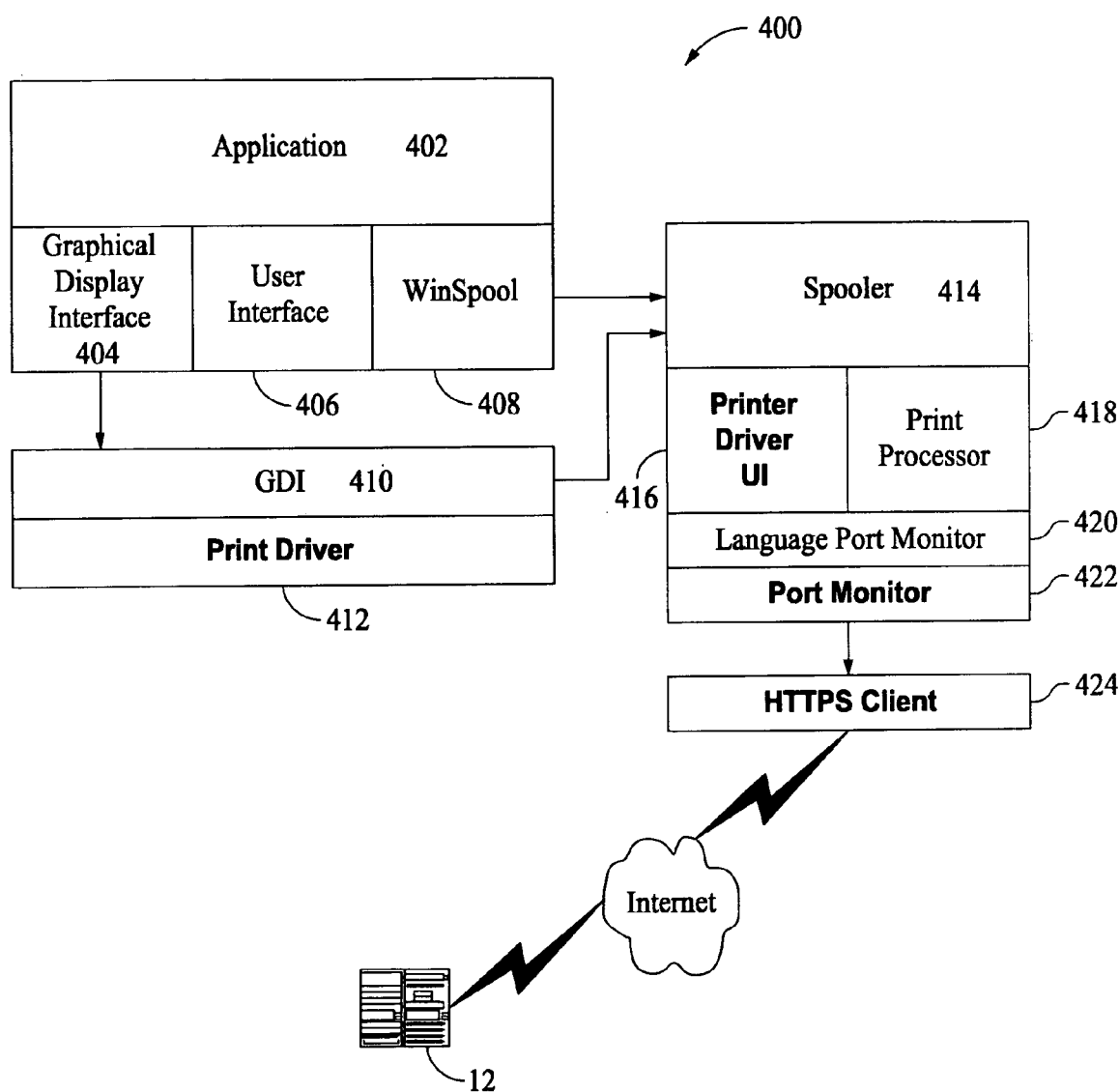
FIG. 18 is an activity diagram for generation of customer defined reports, and integrating reporting and exhibit completion.

FIG. 18 is a block diagram of a virtual printer 400. Virtual printer 400 may, for example, be implemented in financial officer computer 44 (FIG. 1). Printer 400 includes an application layer 402 that communicates with a graphical display interface 404, a user interface 406, and a spooler interface 408, e.g., WinSpool in the Windows operating system. Interface 404 communicates with a graphics device interface 410 that communicates with a print driver 412. Print driver 412 captures text output, e.g., in ASCII, while providing a reasonable approximation of the document layout. Graphical components are discarded. Since the output is plain text, driver 412 supports fixed width fonts to help preserve document layout. Other fonts are supported through substitution with the designated fixed width font. Additionally, the supported fonts are small point sizes, in order to prevent the application from truncating, or overlaying text. Driver 412 also supports large paper sizes (E or larger), to prevent text from wrapping.

Virtual printer 400 also includes a spooler 414 that communicates with WinSpool 408 and GDI 410. Spooler 414 communicates with a print driver user interface 416 and a print processor 418, which communicate with a language port monitor 420. Interface 416 allows custom properties to be associated with the virtual printer. These properties include information that is required to transmit information over the Internet. These properties are stored to preserve the settings with the user's profile, and include the URL to post the data to, UserID, Password, Password Policy, Always Ask (every time a document is submitted, the port monitor prompts the user for their password), and Remember Password (the print driver user interface stores the password, and provides the password to the port monitor).

Additionally, and when transmitting information to be extracted as described below in print scraping, print driver user interface 416 limits properties of the printer, so the user cannot alter the layout of the document. For example, driver 412 does not allow the user to alter the paper size. The paper size is fixed to huge paper (E or larger) to reduce the possibility of wrapping. Driver 422 does not allow the user to select multiple copies for printing, nor does driver 412 allow a user to select duplex printing. Driver 412 also supports small, fixed width fonts, through substitution, and discards graphics.

A port monitor 422 communicates with monitor 420, and during the StartDoc entry point in Windows print services, port monitor 422 requests a username and password, based on the custom properties associated with the virtual printer. The printed information is then routed to a temporary file. Once all the information is written to that file, an HTTPS Client 424 is invoked as a detached process, with the appropriate parameters to transmit the data over the Internet. Of course, other protocols such as SMTP, HTTP, and FTP can be used for such transmission. The information needed to submit the data electronically is provided from the custom properties defined by printer driver user interface and includes the name of the temporary file created by port monitor. After the HTTPS Client terminates, the temporary file is removed regardless of successful transmission.

HTTPS client 424 leverages the WinInet library (of course, operating systems other than Windows could be used) to perform the secure HTTP negotiation. HTTPS client 424, in an exemplary embodiment, is a stand-alone console application, which port monitor 422 invokes as a detached process. HTTPS client 424 could, alternatively, be integrated with port monitor 422. Optionally, users could leverage stand-alone HTTPS client 424 to submit reports in a batch mode, from a scripting environment.

Upon startup, HTTPS client 424 checks whether the user needs to establish a connection with their ISP. If no connection exists, the user will be prompted to connect. After establishing that there is Internet connectivity, client application 402 compresses the temporary file and submits the compressed file to the designated URL using the supplied user name and password information for authentication. Due to the nature of the HTTP POST protocol, the entire document must be assembled before beginning transmission, which prevents the streaming of data as the document is being prepared. HTTPS client 424 provides progress indication to spooler 414. Alternatively, a pop-up progress bar can be provided to indicate transmission progress from within the HTTPS client application.

Print Scraping

Automatically exchanging information with another party via electronic documents is difficult. Typically both parties agree on using a common set of file exchange formats, which requires both parties to implement the necessary software logic to work with the mutually agreed upon exchange formats. However, when one of the participants involves a legacy computer application, it may not be practical to actually modify the application. Information therefore is exchanged using unstructured documents available through existing mechanisms, e.g., standard reporting interfaces and messaging mechanisms. To facilitate such unstructured information exchanges, software packages are commercially available that allow users to interactively work with unstructured electronic documents, define scripts to extract structured information from these documents, and facilitate importing the extracted information into a software system. However, these processes tend to be manual and require human knowledge and intervention to handle the arbitrary arrival of unstructured document types.

Set forth below is a description of a system and process that automate receiving of unstructured information contained in electronic documents, detecting the document type, determining the corresponding document format, extracting structured information from the source document, and populating an information store with the extracted information for analysis purposes. Generally, the electronic documents are pre-characterized and mapping/translation details are developed as scripts on a per document type basis. These mapping/translation scripts are then automatically selected and used to automatically drive the subsequent information extraction processes.

Although print scraping is described herein in the context of financial lending, and specifically in the context of systems 10 and 50, print scraping can be utilized in many other contexts. Print scraping can be used in connection with extracting information from a legacy report format. More specifically, print scraping is performed using processes that extract meaningful data from flat files from various systems in order to update a database. Since legacy systems vary in format and structure reports differently, print scraping is used to parse out the required data for the database. As part of the process, the data is validated for errors and, in the context of financial lending, for example, the necessary business logic is applied for determining the credit availability for a client.

Figure 19:
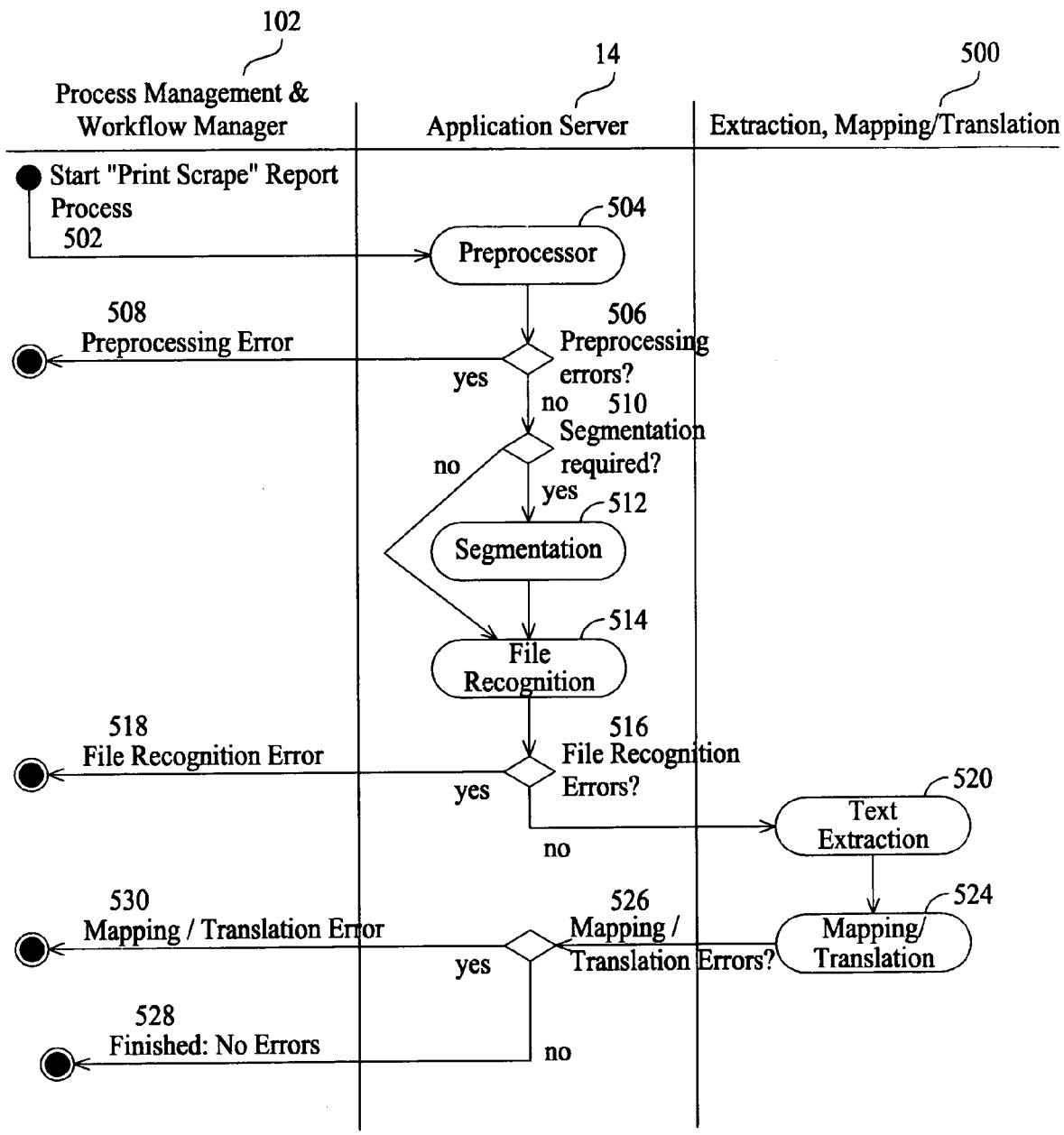
FIG. 19 is an activity diagram illustrating print scraping processes.

Referring to FIG. 19, print scraping is performed by application server 14, process management and workflow manager 102, and an engine, sometimes referred to as a mapping and translation engine 500, such as the commercially available tools from Data Junction, which contain a suite of applications for defining grammars to parse files of non-uniform structure in order to perform print-scraping. The text extraction, in the exemplary embodiment, is performed by a commercially available system such as the known Cambio system. Once a script has been defined, the file can be parsed and pertinent data can be extracted, manipulated, mapped and transformed into a variety of output formats including direct inputs over ODBC into relational databases (e.g., an Oracle database) or output into a structured text file, such as an XML file.

The scripts can be exported from the development/testing environment and run in batch mode, or through scheduled processes on a workstation/server (e.g., a Solaris Unix or Hewlett-Packard servers) to process large numbers of similar files in the mapping and translation engine. These capabilities allow for easy integration into a workflow or pipeline style architecture. For each client, scripts are generated to parse the file formats for the pertinent data. These scripts are registered in repository 100, with a set of regular expressions, used for file recognition during the process.

Generally, the client integration system is a 3-tier pipeline within system 10. The pipeline is initiated by a user/customer who connects to application server 14 via the Internet or a print driver service. Upon uploading a file or group of files, the pipeline process begins first by trying to recognize what type of file the customer has uploaded against a repository of known file types for that user. If successful, recognition occurs and the process proceeds to the next stage, which is the parsing of data using a print scraping tool. In this stage, jobs are scheduled for processing in a priority queue/resource management system. Once processed, any errors that occur are submitted to workflow engine 20 and if no errors occur, the outputted extracted data from the print-scraping is read and mapped into a relational database, under control of the process management and workflow system.

More specifically, and referring again to FIG. 19, once operations start 502, preprocessing 504 is performed to initiate file recognition. In this process, files that were uploaded by the user are scanned to determine whether preprocessing is needed. Preprocessing includes the extraction of electronic files from an archived formatted file such as ZIP or GZIP as well as conversions from standard character sets (e.g. EBCDIC to ASCII). Preprocessing also allows for extension in terms of the types of files that may need to be preprocessed. Preprocessing is flexible in that any processing techniques that may be needed can be utilized.

After the file has been preprocessed as described, and if there are preprocessing errors 506, a preprocessing error 508 message is generated, the execution flow through the processing pipeline is halted, and control is returned with the error condition to process management and workflow manager 102. If there are no errors, and if the file needs to be segmented 510, a segmenting process 512 is initiated. If no segmentation is needed, the file is submitted with the data retrieved about known filetypes from data repository 100 to a file recognition process 514.

Segmentation is performed by attempting to identify the rows and columns in a document based on the layout of information within that document. This problem is known as the shifting columns problem and is largely caused by users changing the format of the document by increasing or decreasing the size of the columns from within the legacy systems. If the user changes the size and/or the spacing of the columns in the submitted file, it renders the submitted file unrecognizable by the extraction and mapping/translation processes, which rely on positional information of the data in order to extract the pertinent data from the files. Therefore, if necessary, a column recognition process is used on the file using segmentation and other graphical analysis algorithms to identify "edges" which define the boundaries of tables and columns within the tables. The segmentation process produces a delimited file, which does not depend on positional information. The outputted file from this process corrects the positional problems caused by the shifted columns and allows for the extraction and mapping/translation processes to work properly. Once segmentation is complete, or if no segmentation is necessary, the resultant file is submitted along with the known data types retrieved from the data repository to a file recognition process 514.

For file recognition 514, a list of known file types is retrieved from data repository 100 for the specific user who submitted the document. This list along with the preprocessed file is submitted to a screening algorithm which scans the file against a list of regular expressions contained within the list of known file types. The scanning algorithm searches for a match between the content of the preprocessed file and one of the stored regular expressions. If a file has gone through the entire set of regular expressions for the given user and no match is made 516, control is returned to process management and workflow manager 102 with an error message 518. If a file has gone through the set of known regular expressions and the file matches more than one regular expression in the set, an error 518 is sent and control is returned to process management and workflow manager 102 indicating that the file could not be recognized. In this case, the filetype is ambiguous since it has matched more than one regular expression and therefore, a decision about which extraction and mapping/translation scripts to select can not be made. If a file is successfully matched with a corresponding regular expression, then the file, the data extraction script, and a translation script are passed on to a text extraction process 520.

When a given file reaches text extraction, it has been identified by file/report type as a specific type and the correct extraction script that can handle this file has been selected. The extraction script is used to extract relevant data from the flat file into a format from which mapping and translation 524 can occur.

Data extracted during text extraction 520 is then mapped and translated 524 into an intermediate format. This process uses a script that dictates how to map the extracted data to the intermediate file format. If successful 526, the parsed data are then passed to process management and workflow manager 102 for further processing 528. If errors occur during the mapping and translation of the extracted data, then a message 530 is sent and control is returned to process management and workflow manager 102.

Figure 20:
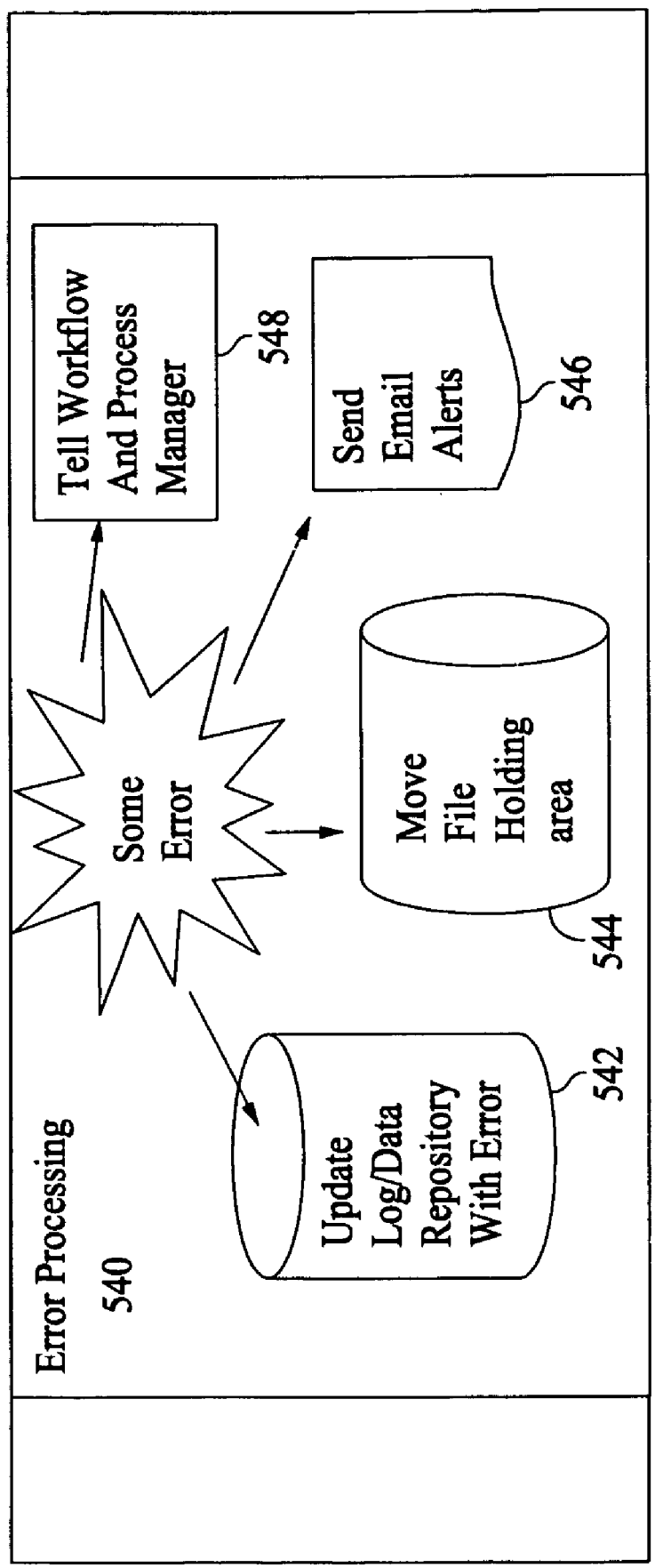
FIG. 20 illustrates error processing.

Referring now to FIG. 20, and for error processing 540, errors output at steps 508, 518, and 530 result in updating an error log in data repository 542, moving the file with the error to a holding queue 544 in the workflow and process management system, and sending notifications, e.g., via e-mail alerts 546 to those specified to receive the alerts. In addition, manager 102 is notified 548 of the error.

Priority queuing may be necessary due to the manner in which the workflow and process management software is licensed, e.g., may not always have sufficient engine capacity to process all jobs. With respect to priority queuing when the system is not in a steady state, N low priority jobs may take up all the system resources. Depending on the size of the job and possible computational complexity of these jobs, the queue may become overloaded with smaller jobs that will not be executed within the specified time limit. If the arrival rate of the smaller jobs is greater than the speed at which the processing engine can complete a job, then the average response time for a task to complete will increase. Therefore, it is possible that the response time will exceed the allowable processing time. Preemptive processing and/or a specified scheduling of the engines can be used to avoid this problem. Specifically, in preemptive processing, if no free engines are available for a high priority job, a low priority job is suspended and rescheduled to free an engine for the use by the high priority job. If a low priority job is always preempted by a high priority job, it may never finish.

To avoid starvation of low priority jobs, the following logic can be applied through the scheduling of the engines. If the system setup is such that one engine can be used for low priority or high priority jobs with the remaining engines being reserved for high priority jobs, then preemptive processing can occur in the following manner. If a process has a low priority and the queue is empty but the low priority engine is blocked, i.e., in use, then it can try to start running on a high priority engine. If at some point all engines are blocked and the low priority job is still blocking the high priority engine, it can be preempted and forced to wait for the low priority job engine to be freed if processes of higher priority enter the system. If in the queue there exist a low priority job and a high priority job, but the low priority engine becomes free, the low priority job is given the engine. This is done to avoid starvation of the low priority jobs and to ensure that the low priority jobs will complete. A low priority job is not preempted from using the low priority engine.

Processing

Exemplary processes that can be performed using systems 10 and 50, including electronic report submission, the virtual printer and print scraping, are described below. The processes can be performed using such exemplary systems, or alternatively, with other systems capable of performing the identified activities. Such processing therefore is not limited to being performed by systems 10 and 50.

Figures 21A, 21B, 21C:
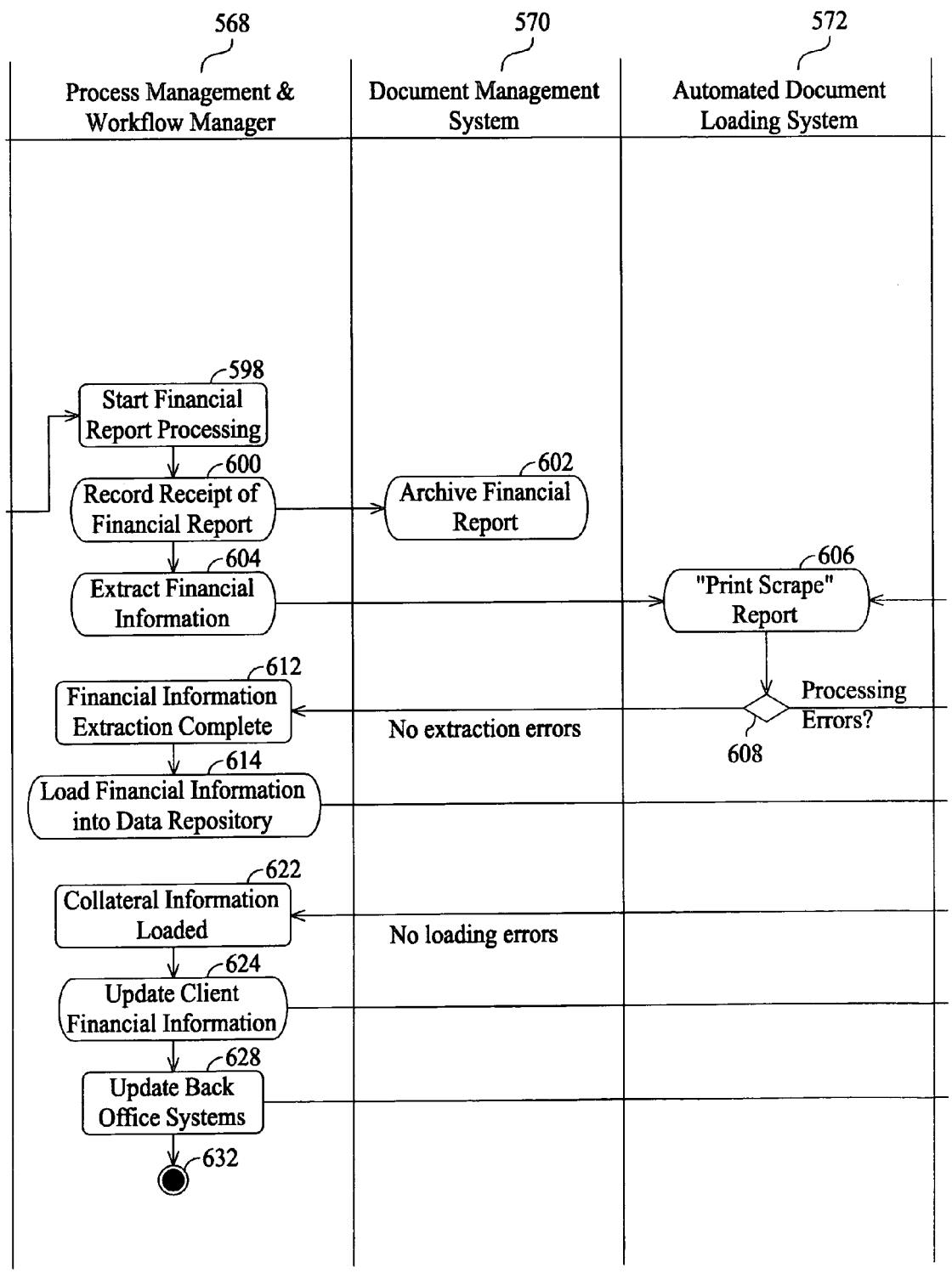
FIGS. 21A–21C show an activity diagram for monitoring accounts receivable, accounts payable, and inventory.

Referring now specifically to the drawings, FIGS. 21A–21C show an activity diagram for monitoring accounts receivable, accounts payable, inventory, trading partners, chart of accounts, invoices, and payments. Activities are located in respective columns based on the system that performs the activity, and the columns correspond to a client user system 560, a legacy accounting system 562, a report submission system 564, a web server 566, a process management and workflow system 568, a document management system 570, an automated document loading system 572, an online data repository system 574, a back office system 576, and a quality control system 578. Upon initiation of operations 580, user 560 reviews and approves the financial information 582. Accounting system 562 then generates a financial report 584, and a connection with web server 566 is established 586. An authentication routine 588 authenticates the user/client 590. Once authenticated 592, the financial report is transmitted 594 and web server 566 receives the report 596. Activities 586, 588, 592, and 594 correspond to the client report submission process described above. Process management and workflow system 568 then starts financial report processing 598 and records receipt of the report 600. The report is archived 602 in document management system 570. Financial information is then extracted 604, and a print scrape report 606 is generated, e.g., in accordance with the print scraping process described hereinbefore. If there are processing errors 608, then quality control system 578 reviews and corrects extraction problems 610, and another print scrape report 606 is generated. If there are no extraction errors, then extraction is complete 612. The financial information is then loaded into the data repository 614, and once loaded 616, and if there are data loading errors 618, then quality control system 578 reviews and corrects any errors 620 and the financial information is again loaded 616. If there are no errors, then process management and workflow system 568 loads collateral information 622, e.g., A/R, A/P, and inventory information. The client information is updated 624, and the updated financial information is merged with account details 626. In addition, the back office systems are updated 628, and client availability information 630 also is updated. Processing is then complete 632.

FIGS. 22A–22C show an activity diagram for a facsimile-based client report submission. Activities are located in respective columns based on the system that performs the activity, and the columns correspond to a client user 640, an outbound fax machine system 642, an inbound fax server 644, a process management and workflow system 646, a document management system 648, a collateral analyst 650, and a data repository system 652. Upon starting operations 654, user 640 determines whether it has the required paper collateral 656. The collateral is then sent via fax 658, and is received 660 by inbound fax server 644. Upon receipt 662, the fax documents are compressed 664, and the compressed documents and the sender's station identifier are sent 666 to system 646. Upon receipt of this information 668, system 646 then records the document based on the sender identifier 670, e.g., caller identification of phone or station identifier for fax machine, and the collateral document is archived 672. The document is then placed in a queue for review 674. Once the document review process is initiated 676, then collateral analyst 650 is prompted to review the document 678. The document is then pulled for review 680, and the document is matched with the client financial information 682 and a link is established between the document and the corresponding financial information 684. The collateral document also is archived with the matched financial information 686. The processing is then complete 688. An example of the matching process is matching a bill of lading with an invoice.

With respect to matching document with financial information 682, the facsimile based collateral is used to verify that A/R or inventory information listed on a client's books is actually correct. The information provided in an invoice and bill of lading provide sufficient information for a collateral analyst to contact a client and ensure that these entries are indeed correct. In order to support this process, the document images are classified and matched to the corresponding general ledger information. The matching process could be automated through form recognition and OCR mechanisms. However, the document images are typically facsimiles of copies of the original documents and thus may be too poor in image quality for automated processing.

With respect to linking documents to financial information 684, once a document image has been reviewed, classified, and matched to specific A/R or inventory entries, the document image is linked to the information in the data repository for later retrieval in a fraud detection process (e.g., on-site audit or verification phone call to borrowing client's customer or supplier).

FIGS. 23A–23B show an activity diagram for processing cash advance requests. Activities are located in respective columns based on the system that performs the activity, and the columns correspond to a client user web browser 700, a web server 702, a process management and workflow system 704, a document management system 706, an online data repository 708, and back office system 710. Upon starting operations 712, the client determines a need to borrow money 714. The client then connects to the web server 716, and authenticates to the server 718. Web server 702 then authenticates the client 720. Once authenticated 722, the user initiates a request for a cash advance 724. The request is forwarded 726 by server 702, and a cash advance request is created 728 by system 704. The cash advance request is recorded 730 and archived 732 by document management system 706. The current collateral information of the client is then evaluated 734, including a review of the status of current collateral 736. If the collateral is not up-to-date 738, then updated collateral information is provided 740 using the electronic report submission process (described above) and another evaluation is executed 734. If the collateral is up-to-date, then the current credit status of the client is evaluated 742 by analyzing current credit information 744.

In analyzing current credit information 744, a borrowing client's credit information is reviewed including whether money is actually available in the credit line, and whether the borrowing client's business is performing according to expectations. In addition, dilution is identified, e.g., number of credit memos and the discounting of invoices in the A/R. The advance rate also is reviewed. The advance rate refers to the percentage of total available collateral value, and the advance rate is used to determine the total credit line for the borrowing client. In general, the more risk associated with a loan, the lower the advance rate. With enhanced monitoring and reporting of the borrowing client, the advance rate can be increased. In addition, fraud possibilities are reviewed. For example, an increase in sales coupled with an increase in A/R turns may indicate that the borrowing client is not keeping accurate records.

After performing such analysis, a decision 746 is then made to initiate a manual review and approval process 748, or to automatically approve or deny the request 750 in which case the decision is archived 752 and a denial notice is sent to the client 754, or to approve the request 756 in which case the decision is archived 752 and an approval notice is sent to the client 758. If approved, a wire transfer is initiated 760, and a fund transfer is made 762. Once the wire transfer is complete 764, the wire transfer details are archived 766 and the client is notified that the wire transfer is complete 768. Operations are then complete 770.

Figure 24:
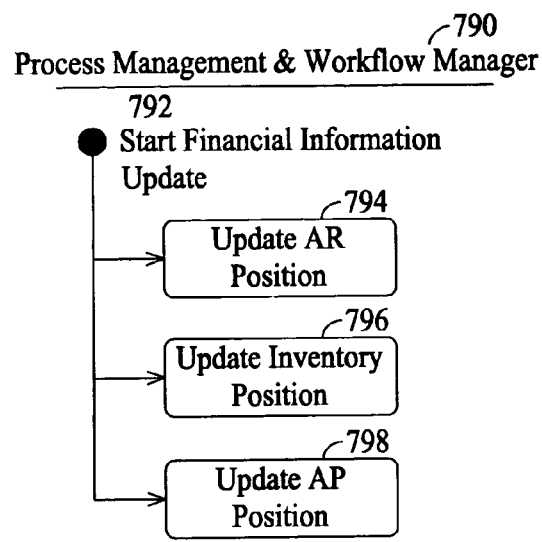
FIG. 24 is an activity diagram for updating financial information.

FIG. 24 is an activity diagram for updating financial information. Activities identified in FIG. 24 are performed by a process manager and workflow system 790. Specifically, upon starting a financial information update 792, the accounts receivable position is updated 794, the inventory position is updated 796, and the accounts payable position is updated 798. Generally, whenever the financial information is updated by receiving new financial information, the A/R, A/P, or inventory information should be updated as well. These processes typically involve reconciling the new information with the current position, identifying and classifying ineligibles, comparing the financial position with loan covenants, and analyzing the information with historical trends for the borrowing customer and against similar industries. Further, composite models that describe the correlation of A/R, A/P, and inventory positions may be used to help identify fraud and possible performance problems for the borrowing customer.

Figure 25:
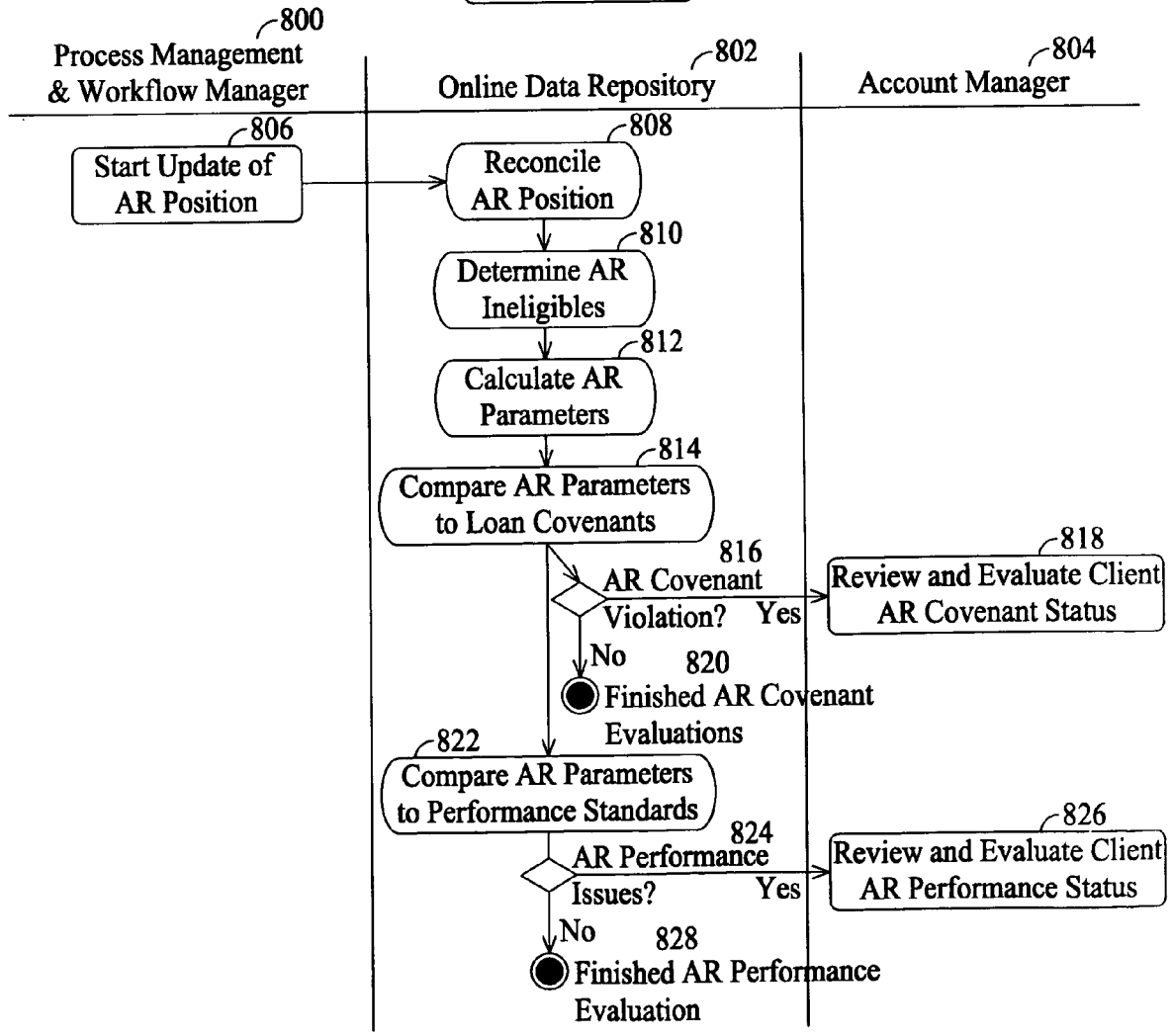
FIG. 25 is an activity diagram for determining accounts receivable performance.

FIG. 25 is an activity diagram for determining accounts receivable performance. Activities are located in respective columns based on the system that performs the activity, and the columns correspond to a process manager and workflow system 800, an online data repository 802, and an account manager system 804. Upon starting an update of an accounts receivable position 806, repository 802 reconciles the accounts receivable (AR) position 808, determine AR ineligibles 810, and calculates AR parameters 812. Reconciling A/R position typically involves reviewing the client's A/R information, and matching invoices with payments and credit memos. Determining A/R ineligibles involves analyzing invoices in the A/R and applying a set of criteria that declares that certain invoices cannot be used to determine the current credit line (borrowing base). The criteria for deeming an invoice ineligible include contras (invoices to companies that the borrowing client also owes money), concentration (typically a limit is set on the maximum percent of business that a borrowing client may have with a customer and have it count towards the borrowing base), aging (invoices that have not been paid after a specified number of days since issued) and cross aging (if more than a specified percent of the total A/R for a specific customer is past due, then the entire A/R for that customer is declared ineligible).

The AR parameters (e.g., turn times, fixed charge coverage) are then compared to loan covenants 814. If an AR covenant violation is found 816, then the AR covenant status is reviewed and evaluated 818 by account manager 804. If no AR covenant evaluation is found 816, then the AR covenant evaluation is complete 820. In addition, and after comparing AR parameters to loan covenants 814, the AR parameters are compared to performance standards 822. Historical and industry-specific information can be used to detect aberrations in the borrowing customer's performance and may be used to help identify trouble early. An example of a comparison method is a statistical process chart. If AR performance issues are found 824, then the AR performance status is reviewed and evaluated 826 by the account manager 804. If AR performance issues are not found, then the AR performance evaluation is complete 828.

Figure 26:
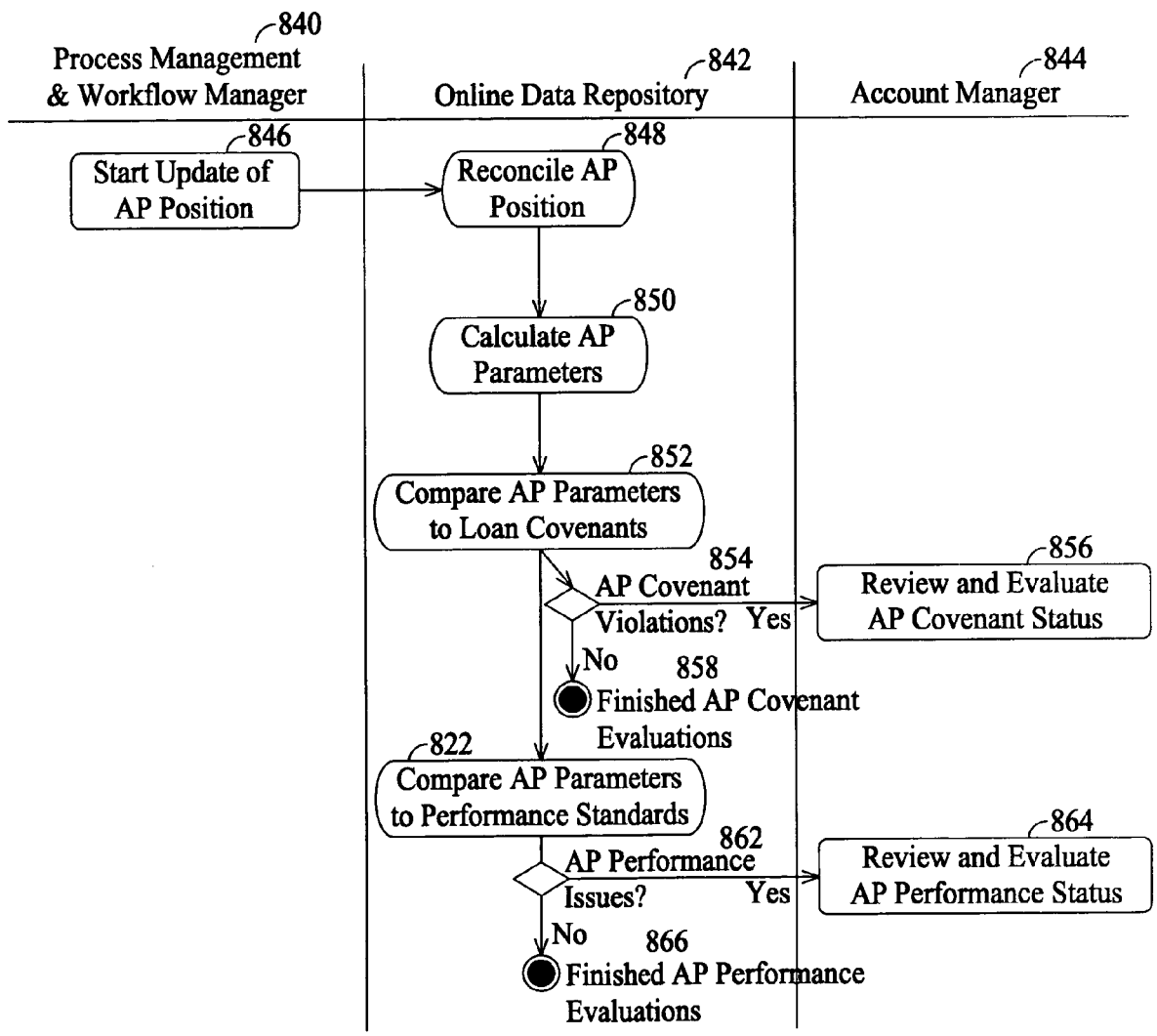
FIG. 26 is an activity diagram for determining accounts payable performance.

FIG. 26 is an activity diagram for determining accounts payable performance. Activities are located in respective columns based on the system that performs the activity, and the columns correspond to a process manager and workflow system 840, an online data repository 842, and an account manager system 844. Upon starting an update of an accounts payable position 846, the accounts payable (AP) position is reconciled 848 (e.g., matching payments with invoices and credit memos) and AP parameters are calculated 850 by system 842. The AP parameters are then compared to loan covenants (e.g., turn times, fixed charge, coverage) 854, and if there is an AP covenant violation 854, then the AP covenant status is reviewed and evaluated 856. If there is no AP covenant violation, then the AP covenant evaluation is completed 858. Also, and after comparing AP parameters to loan covenants 852, the AP parameters are compared to performance standards 860. Historical and industry-specific information can be used to detect aberrations in the borrowing customer's performance and may be used to help identify issues. An example of a comparison method includes statistical process charts. If AP performance issues are identified 862, then the AP performance status is reviewed and evaluated 864. If there are no AP performance issues, then the AP performance evaluation is complete 866.

Figure 27:
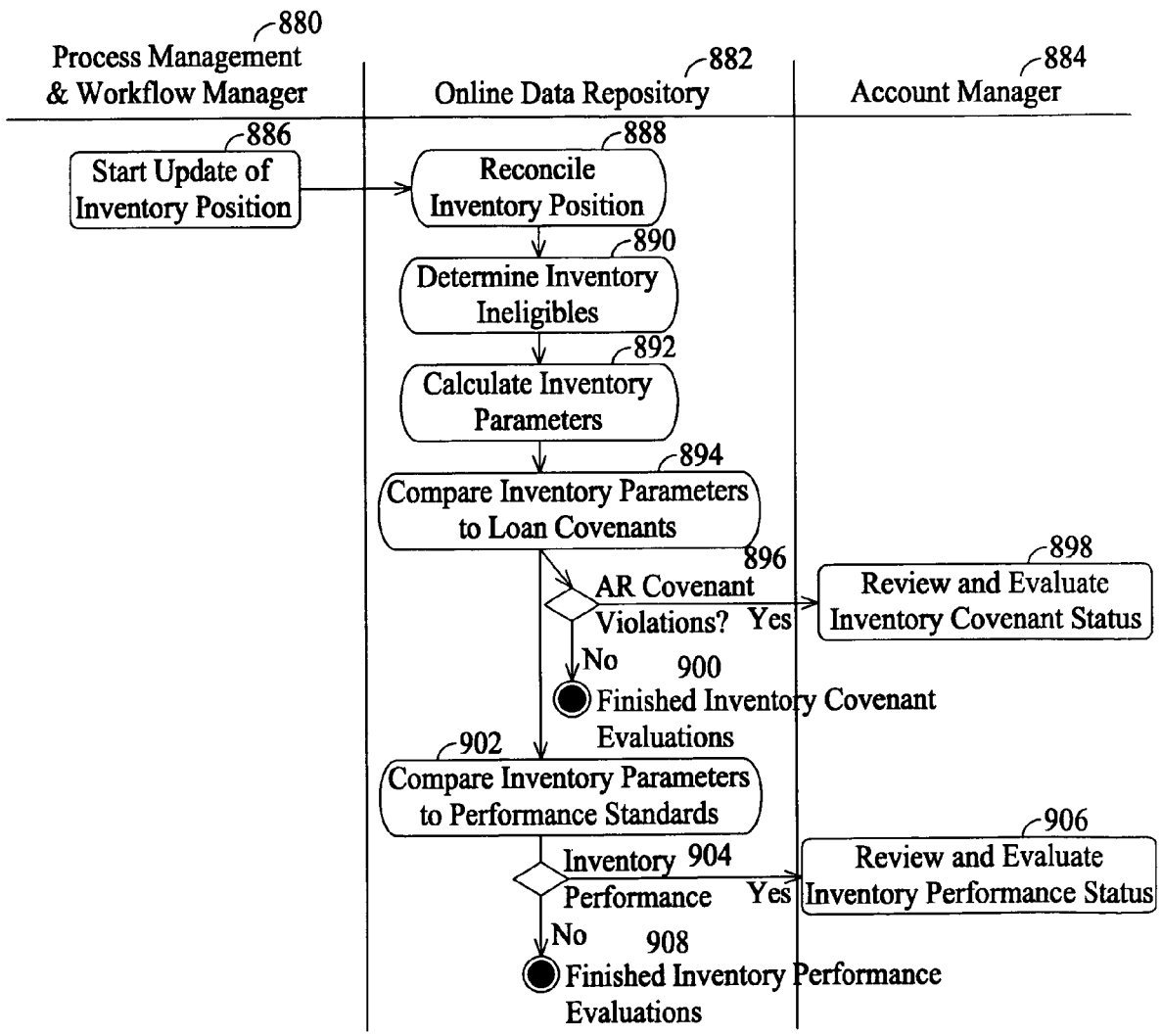
FIG. 27 is an activity diagram for determining inventory performance.

FIG. 27 is an activity diagram for determining inventory performance. Activities are located in respective columns based on the system that performs the activity, and the columns correspond to a process manager and workflow system 880, an online data repository 882, and an account manager system 884. Upon starting an update of an inventory position 886, the inventory position is reconciled 888 and inventory ineligibles are identified 890. The determination of ineligibles involves analyzing the inventory information and applying a set of criteria that declares certain inventory items ineligible for the current credit line (borrowing base) or as being handled using a specific valuation formula (typically a fixed percentage). The criteria for deeming inventory items ineligible include obsolete inventory (for example, any item in stock for more than one year), breakage and scrap, sold to foreign entities, and inventory type (raw materials, work in progress, and finished goods in inventory might be valued differently).

Inventory parameters are then calculated 892 and the inventory parameters are compared to loan covenants 894. If an inventory covenant violation is found 896, then the inventory covenant status is reviewed and evaluated 898. If no violations are found, then the inventory covenant review is complete 900. Also, and after comparing inventory parameters to loan covenants 894, the inventory parameters are compared to performance standards 902. Historical and industry-specific information can be used to detect aberrations in the borrowing customer's performance and may be used to identify issues early. A statistical process chart could be used in performing such comparison. If inventory performance issues are identified 904, then the inventory performance status is reviewed and evaluated 906. If no inventory performance issues are identified 904, then the inventory performance evaluation is complete 908.

Risk Management

Risk management is accomplished using process management and workflow manager 102, electronic document management and control system 104, interactive analysis and reporting tools 122, and automated credit analysis and scoring methods. Process management and workflow manager 102 provide the basis for automating, enforcing, and tracking the defined business processes and rules (e.g., review and approval processes). When the borrowing customer and internal communications are handled electronically, document management system 104 stores and retrieves the information, as well as provides the basis for long-term archival storage of these documents, which also is useful in supporting audits and fulfilling legal obligations.

Interactive analysis and reporting tools 122 summarize the financial environmental and provide interactive "drill-down" on summary information to supporting detail information (via hypertext links, for example) for both specific borrowing customers and portfolios of borrowing customers. Tools 122 also are useful (or provide value added information services (e.g., competitive benchmarking) for the borrowing customers. Reporting tools 122 operate in mix of both batch and real-time execution modes and can be readily customized to generate new canned business reports as well as support extracts for off-line data analysis.

Reporting tools 122 also generate the reporting information in a variety of formats (HTML, PDF, Excel) and are used for both printing and interactive on-line use. Batch reports are automatically routed to appropriate individuals and roles based on business process and rules defined and executed by the process management and workflow manager 102.

A variety of tools and methods also are used to facilitate automation and scoring of a borrowing customers financial information. These tools are useful for assessing the financial performance, detecting fraud, and supporting automated decision making activities in the various business processes. Furthermore, these tools are applicable to other risk management activities associated with both specific borrowing customers as well as portfolios of borrowing customers. Examples of such tools include determining ineligibles, performance standards, and covenant parameters, as described above.

While the invention has been described in terms of various specific embodiments, those skilled in the art will recognize that the invention can be practiced with modification within the spirit and scope of the claims.

The invention claimed is:

1. A method for submitting a report from an accounting system to an automated lending system including a server, a local file system being coupled to the accounting system, said method, comprising the steps of:

generating at the accounting system a report having at least one of a defined report format and a defined translation service;

exporting the report from the accounting system to a local file;

submitting the report from the local file system to the server;

determining at the server whether the submitted report has the at least one of the defined report format and the defined translation service and the undefined format; and extracting via the server information from the report based on at least one of the defined report format and the defined translation service to generate at least one exhibit to the report, wherein extracting information from the report includes determining whether preprocessing of the report is needed, determining whether segmentation of the report is needed wherein segmentation includes identifying a location of data within the report and relocating data within the report such that the document is recognizable, performing a document recognition process, and performing a mapping and translation process on the report, and wherein the at least one exhibit summarizes selected information included in the report.

2. A method in accordance with claim 1 wherein submitting the report comprises attaching the report to a web form.

3. A method in accordance with claim 1 further comprising the step of extracting information from the report using a print scraping process.

4. A method in accordance with claim 1 wherein the local file system is accessible by a browser, and wherein submitting the report from the local file system to the server further comprises submitting the report from the local file system to the server using the browser.

5. A method in accordance with claim 1 wherein generating at the accounting system a report further comprises generating at the accounting system a report having a defined report format.

6. A method in accordance with claim 1 wherein extracting via the server information from the report further comprising utilizing the defined translation service at the server to extract information from the report and then generate at least one exhibit based on the extracted information.

7. A method in accordance with claim 1 further comprising the steps of:

determining whether preprocessing of the report is needed;

performing a document recognition process including scanning the report to determine a file type of the report and comparing the file type to a list of known file types stored in a data repository; and performing a mapping and translation process on the report including selecting an extraction script based on the document recognition process for extracting and translating data from the report.

8. A method in accordance with claim 1 wherein determining whether segmentation of the report is needed further comprises the steps of:

attempting to identify rows and columns in the report; and generating a delimited document.

9. A method for submitting a report from an accounting system to an automated lending system including a server, the accounting system including a virtual printer, said method, comprising the steps of:

generating at the accounting system a report having at least one of a specified report format, and a defined translation service;

transmitting the report from the accounting system to the server via the virtual printer;

determining at the server whether the submitted report has the at least one of the specified report format, and the defined translation service; and extracting via the server information from the report based on at least one of the specified report format, and the defined translation service to generate at least one exhibit to the report, wherein extracting information from the report includes determining whether preprocessing of the report is needed, determining whether segmentation of the report is needed wherein segmentation includes identifying a location of data within the report and relocating data within the report such that the document is recognizable, performing a document recognition process, and performing a mapping and translation process on the report, and wherein the at least one exhibit summarizes selected information included in the report.

10. A method in accordance with claim 9 further comprising the steps of:

determining whether preprocessing of the report is needed;

performing a document recognition process including scanning the report to determine a file type of the report and comparing the file type to a list of known file types stored in a data repository; and performing a mapping and translation process on the report including selecting an extraction script based on the document recognition process for extracting and translating data from the report.

11. A method in accordance with claim 9 wherein extracting via the server information from the report further comprising the steps of:

determining whether to utilize the defined translation service to extract information included in the report; and utilizing at the server, if needed, the defined translation service to extract information included in the report and then generate the at least one exhibit based on the extracted information.

12. A method in accordance with claim 9 wherein determining whether segmentation of the report is needed further comprises the steps of:

attempting to identify rows and columns in the report; and generating a delimited document.

13. An automated lending system comprising an accounting system coupled to a local file system, and a server for communicating with said local file system, said accounting system configured to generate a report having at least one of a defined report format and a defined translation service, and export the report to said local file system, said server configured to:

receive the report from said local file system;

determine whether the report has the at least one of said defined report format, and said defined translation service; and extract information from the report based on at least one of said defined report format, and said defined translation service to generate at least one exhibit relating to the report, wherein the exhibit summarizes selected information included in the report and links the summarized information included in the report, wherein extracting information from the report includes determining whether preprocessing of the report is needed, determining whether segmentation of the report is needed wherein segmentation includes identifying a location of data within the report and relocating data within the report such that the document is recognizable, performing a document recognition process, and performing a mapping and translation process on the report.

14. A system in accordance with claim 13 wherein said local file system is accessible by a browser.

15. A system in accordance with claim 13 wherein said server is further configured to utilize said defined translation service to extract information included in the report and then generate the at least one exhibit based on the extracted information.

16. A system in accordance with claim 13 wherein said server is further configured to:

determine whether preprocessing of the report is needed;

perform a document recognition process including scanning the report to determine a file type of the report and comparing the file type to a list of known file types stored in a data repository; and perform a mapping and translation process on the report including selecting an extraction script based on the document recognition process for extracting and translating data from the report.

17. An automated lending system comprising an accounting system including a virtual printer, and a server for communicating with said accounting system, said accounting system configured to generate a report having at least one of a specified report format, and a defined translation service, and transmit the report to said server via said virtual printer, said server configured to:

receive the report;

determine whether the report has the at least one of said specified report format, and said defined translation service to generate the at least one exhibit relating to the report, wherein the exhibit summarizes selected data included in the report and links the summarized data included in the exhibit to corresponding data in the report, wherein extracting information from the report includes determining whether preprocessing of the report is needed, determining whether segmentation of the report is needed wherein segmentation includes identifying a location of data within the report and relocating data within the report such that the document is recognizable, performing a document recognition process, and performing a mapping and translation process on the report.

18. A system in accordance with claim 17 wherein said server is further configured to:

determine whether to utilize said defined translation service to extract information included in the report; and utilize, if needed, said defined translation service to extract information included in the report and then generate the at least one exhibit based on the extracted information.

19. A system in accordance with claim 17 wherein said server is further configured to:

determine whether preprocessing of the report is needed;

perform a document recognition process including scanning the report to determine a file type of the report and comparing the file type to a list of known file types stored in a data repository; and perform a mapping and translation process on the report including selecting an extraction script based on the document recognition process for extracting and translating data from the report.

* * * * *